US012400164B2

(12) United States Patent
Osborne

(10) Patent No.: US 12,400,164 B2
(45) Date of Patent: Aug. 26, 2025

(54) INTELLIGENT MACHINE-DRIVEN WORKFLOW WITH DECISION DELEGATION

(71) Applicant: ALOGRAM INC., San Diego, CA (US)

(72) Inventor: d'Artagnan Leif Osborne, San Diego, CA (US)

(73) Assignee: ALOGRAM INC., San Diego, CA (US)

( * ) Notice: Subject to any disclaimer, the term of this patent is extended or adjusted under 35 U.S.C. 154(b) by 0 days.

(21) Appl. No.: 18/909,649

(22) Filed: Oct. 8, 2024

(65) Prior Publication Data
US 2025/0117727 A1 Apr. 10, 2025

Related U.S. Application Data

(60) Provisional application No. 63/589,315, filed on Oct. 10, 2023.

(51) Int. Cl.
G06Q 10/0631 (2023.01)
G06Q 10/0633 (2023.01)

(52) U.S. Cl.
CPC ... *G06Q 10/06316* (2013.01); *G06Q 10/0633* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| 8,995,745 | B2 * | 3/2015 | Young | H01J 37/28 |
| | | | | 382/145 |
| 10,148,600 | B1 * | 12/2018 | White | G10L 15/26 |
| 10,999,434 | B1 * | 5/2021 | Andar | G06N 5/04 |
| 2005/0055298 | A1 * | 3/2005 | Czora | G06Q 40/00 |
| | | | | 705/35 |

(Continued)

FOREIGN PATENT DOCUMENTS

KR 10-2020-0083404 A 7/2020

OTHER PUBLICATIONS

Keivalya Pandya, "Automating Customer Service using LangChain", Submitted to the 3rd International Conference on "Women in Science & Technology: Creating Sustainable Career" Dec. 28-30, 2023, pp. 1-4.

(Continued)

*Primary Examiner* — Alan S Miller
(74) *Attorney, Agent, or Firm* — Pillsbury Winthrop Shaw Pittman LLP

(57) ABSTRACT

Provided is a process, including: executing, with the computer system, tasks in the workflow with AI agents; detecting, with the computer system, that a human is needed to assist with a given task among the tasks in the workflow after one of the AI agents attempts the given task; selecting, with the computer system, the human from among a set of humans based on a profile of the human and the given task and sending a message that causes the selected human to perform the given task; and receiving, with the computer system, the selected human's completion of the given task and inputting the human completion of the given task, or input, to one of the AI agents performing a downstream task in the workflow; and storing, with the computer system, a result of completing the workflow in memory.

36 Claims, 13 Drawing Sheets

(56) References Cited

U.S. PATENT DOCUMENTS

| | | | |
|---|---|---|---|
| 2009/0240539 A1* | 9/2009 | Slawson | G06N 20/00 705/7.29 |
| 2013/0322613 A1* | 12/2013 | Clayton | H04M 3/4935 379/202.01 |
| 2014/0037185 A1* | 2/2014 | Young | H01J 37/28 382/145 |
| 2017/0249580 A1* | 8/2017 | Newman | G06Q 10/1095 |
| 2018/0096283 A1* | 4/2018 | Wang | G06Q 10/063112 |
| 2018/0114527 A1* | 4/2018 | Zilotti | H04M 3/527 |
| 2018/0239991 A1 | 8/2018 | Weller et al. | |
| 2019/0389074 A1* | 12/2019 | High | B25J 19/023 |
| 2020/0065334 A1 | 2/2020 | Rodriguez et al. | |
| 2020/0244605 A1 | 7/2020 | Nagaraja et al. | |
| 2020/0262063 A1 | 8/2020 | Perera et al. | |
| 2020/0320455 A1* | 10/2020 | Chin | G06F 3/0482 |
| 2020/0380258 A1* | 12/2020 | Yu | G06V 10/7788 |
| 2021/0042126 A1 | 2/2021 | Perera et al. | |
| 2021/0043099 A1 | 2/2021 | Du et al. | |
| 2021/0192413 A1* | 6/2021 | Shirazipour | G06Q 10/06311 |
| 2021/0279655 A1* | 9/2021 | Fan | G06Q 10/06316 |
| 2022/0164550 A1* | 5/2022 | Papancea | G06Q 30/016 |
| 2022/0289537 A1* | 9/2022 | Davidson | G05D 1/0061 |
| 2022/0292459 A1* | 9/2022 | Sabharwal | G06N 20/00 |
| 2023/0050430 A1* | 2/2023 | Piau | G06F 9/5038 |
| 2023/0092975 A1* | 3/2023 | Kalouche | G05B 19/427 700/259 |
| 2023/0291740 A1* | 9/2023 | Ashby | H04L 63/083 |
| 2024/0045780 A1 | 2/2024 | Aziz et al. | |

OTHER PUBLICATIONS

Omar Khattab et al., "DSPY: Compiling Declarative Language Model Calls Into Self-Improving Pipelines", Oct. 5, 2023, pp. 1-32.

Hui Yang et al., "Auto-GPT for Online Decision Making: Benchmarks and Additional Opinions", Jun. 4, 2023, pp. 1-14.

Ceyao Zhang et al., "ProAgent: Building Proactive Cooperative Agents with Large Language Models", Jan. 11, 2024, pp. 1-9.

"Figure Eight Inc." Wikipedia, The Free Encyclopedia, Oct. 2024, pp. 1-6.

International Search Report and Written Opinion from Int'l Application No. PCT/US2024/050378 dated Jan. 15, 2025.

* cited by examiner

WTA System Process Diagram
200

205
System Identifies decision(s) required to complete pending task(s)

210
System determines operator(s) and corresponding operator device(s) to receive decision(s)

215
System sends asynchronous message to the operator device(s)

220
Operator device(s) receive a message that notifies operator(s) of decision(s) to be made

225
Operator(s) input the decision(s) into their corresponding operator device

230
Operator device sends the decision(s) data back to the system for processing

235
System receives the decision(s) needed to progress or complete pending task(s)

240
System performs action(s) associated with completion of pending task(s)

*FIG. 2*

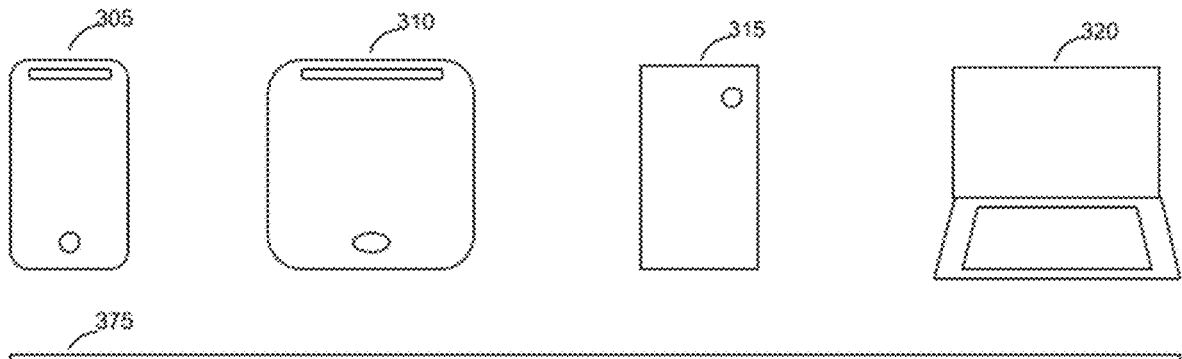
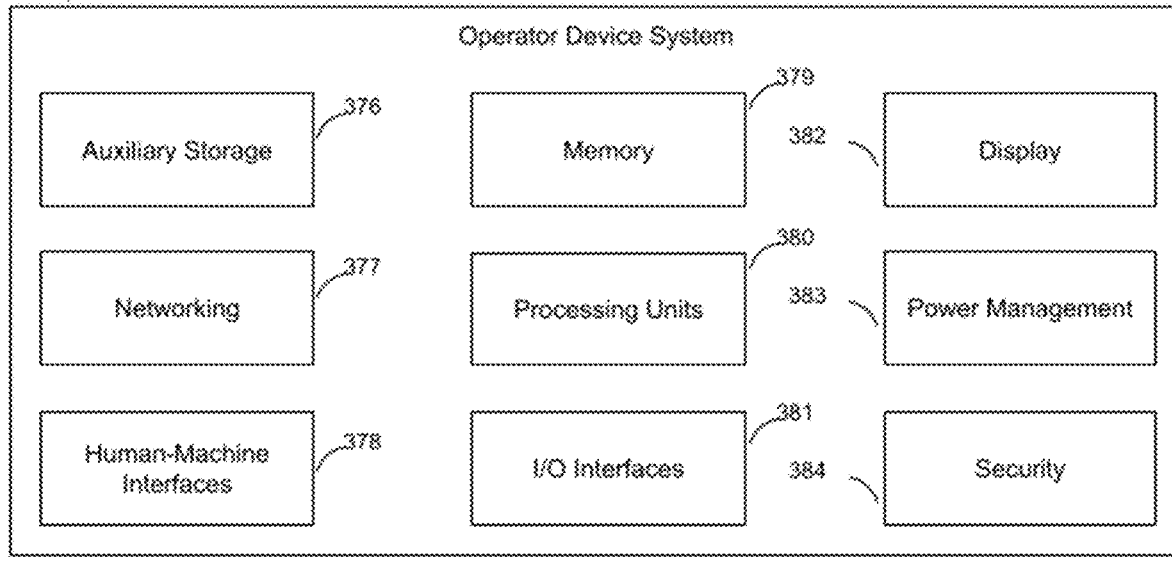
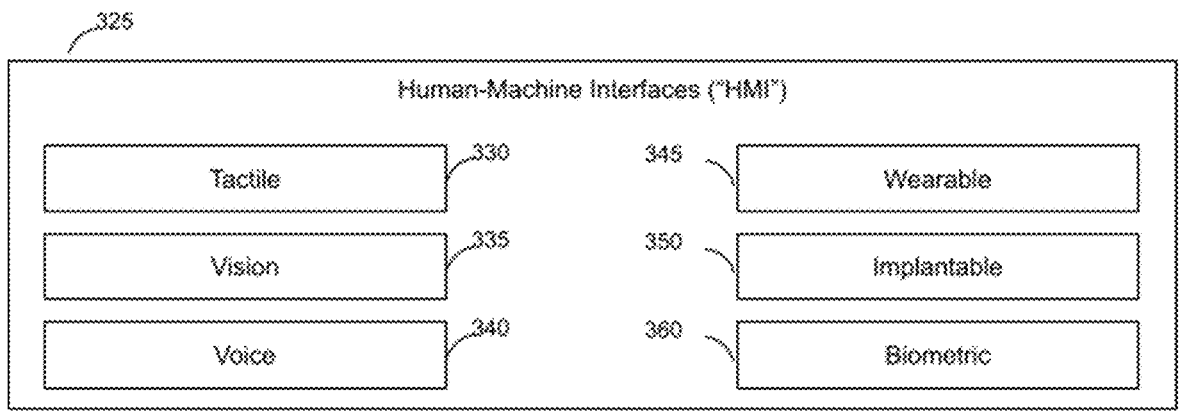
FIG. 3

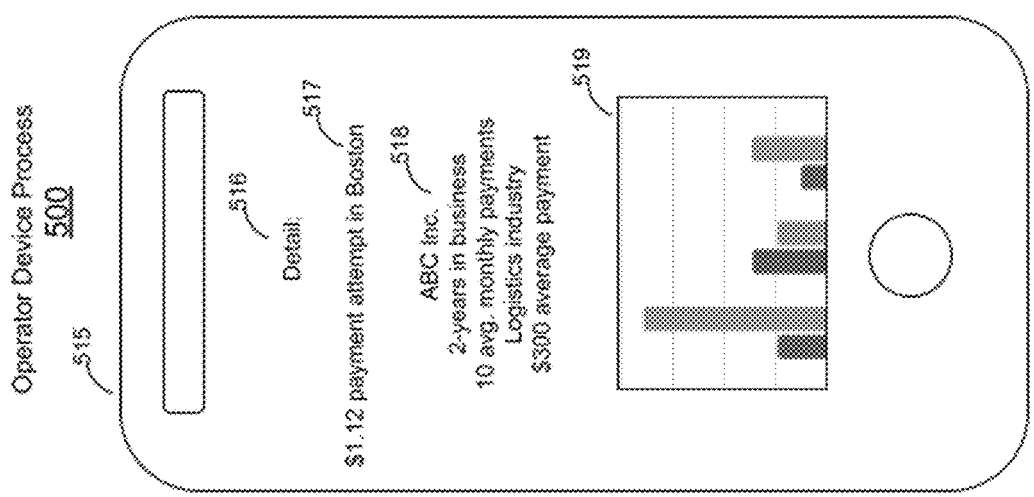
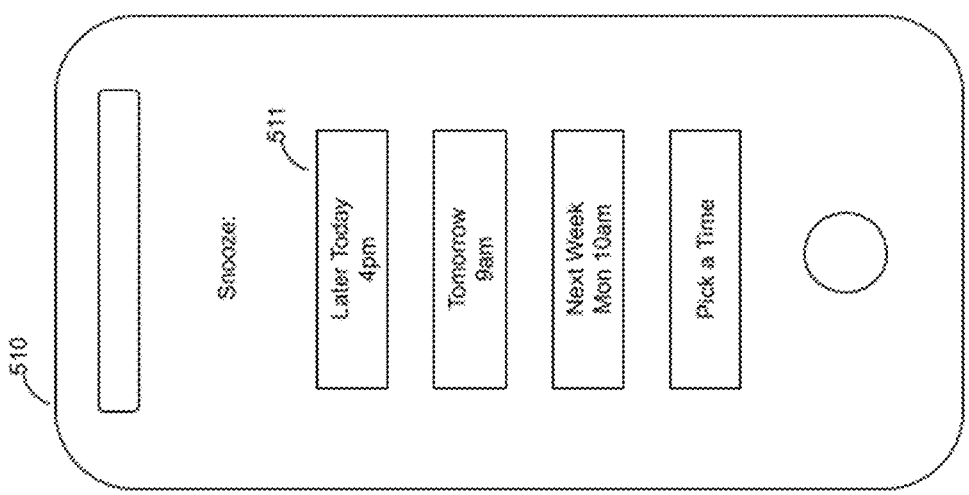
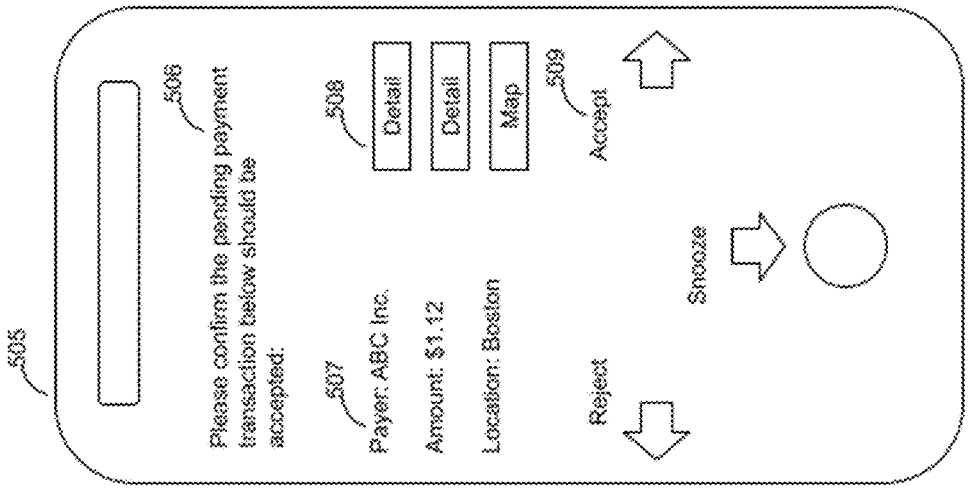
FIG. 5

INTELLIGENT MACHINE-DRIVEN WORKFLOW WITH DECISION DELEGATION

CROSS-REFERENCE TO RELATED APPLICATIONS

This patent claims the benefit of U.S. Provisional Patent Application 63/589,315, filed Oct. 10, 2023, titled "Intelligent Machine-Driven Workflow with Decision Delegation on a Personal Device." The entire content of each aforelisted earlier-filed application is hereby incorporated by reference for all purposes.

BACKGROUND

1. Field

The present disclosure relates generally to intelligent machine agents.

2. Description of the Related Art

The advent and general availability of the personal electronic device with application software has provided business professionals across the world with a more accessible and efficient means of accomplishing work tasks that previously required some expenditure of human labor and resources. Devices such as the mobile phone running application software, can enable a business professional to perform a task through one or more available human-machine interfaces (HMI), such as a touch screen display, microphone etc. However, even with these advancements and the benefits afforded by them, the problem remains that conventional electronic devices such as the mobile phone with business application software often operate in a reactive mode, relying on the business agent operating the device to explicitly prompt or input into the application software to perform a task on behalf of their business. As one example, a mobile electronic device with financial accounting application software installed to track business expenses may rely on the operator at the device to start the application, navigate to the correct menu item within the user interface of the application, and initiate a receipt capture to begin the task. An ability for the operator to use natural language or other inputs to the device, often with personal digital assistants, may provide some increase in efficiency for the operator wishing to complete the task. However, there exists notable challenges with this conventional process of a business agent performing a task on a device which include: an implied and often erroneous assumption that the business agent operating the device possesses cognitive abilities suitable to accurately determine the correct business task to initiate at a given point in time on the device; the action of the operator initiating the business task on the device requires unnecessary expenditure of business resources, notably energy and time, which increase operating costs of the business and decrease margins; further, the time it takes to complete a business task or group of related tasks (a workflow) is generally limited by the speed and serial process required for a human operator to execute the tasks on the device.

Another technological advancement accretive to business task productivity is the ability of mobile electronic devices to communicate over a network to other computing systems, allowing collaboration with these other systems that can assist in carrying out a business task initiated by the business agent operating the device. Such systems are often able to service multiple devices connected to the network and run algorithms that require intensive computing resources to assist the business professional in performing a user-initiated task on behalf of the business. One such algorithm involves the process of machine-learning and execution of the resulting model(s) output from the process. Machine-learning algorithms, such as those developed by data scientists, and their associated models, may provide a method of program execution on a device that provides some advantages over other forms of program execution. One such advantage is that a system running a machine-learning algorithm can seek and use data from resources over a network to improve its own effectiveness and efficiency. Systems using such algorithms may be labeled as "intelligent agents," and they may be able to learn, reason, and perform work better over time in an autonomous or semi-autonomous manner. These intelligent agents may be able to generally boost or augment the effective task-performing capabilities of a business and their human-agents that they communicate with by solving more complex problems and/or speeding up task execution time. However, there exists major barriers to leveraging the aforementioned benefits of intelligent agents practically and broadly within business applications, specifically: intelligent agents running machine-learned models, for example, generative deep learning algorithms, often produce information when prompted that benefit from a situational assessment by persons to validate what is claimed; gaining trust from the business and its human-agents to perform more complex tasks and activities; leveraging intelligent agents benefits from a measure of trust from the human-agents within the business whom are skilled in their field; on-demand access of relevant and accurate data to evolve the machine-learned model(s) (absence of open parenthesis "s" closed parenthesis herein should not be read to imply that the preceding is limited to the singular) generated and run by the intelligent agents is helpful to realize the full potential of efficiency gained by such intelligent agents; and practical method(s) to connect intelligent machine agents to expert human-agents who can make situational assessments and decisions regarding claims made by intelligent agents.

Now, as electronic devices and the application software installed on them are becoming increasingly intelligent and autonomous, there exists an opportunity for businesses to realize massive efficiency gains over other methods of operator-initiated machine tasking and the associated interactions therein helpful to perform increasingly complex and time-consuming workflows across a multitude of business applications and other real-world domains.

SUMMARY

The following is a non-exhaustive listing of some aspects of the present techniques. These and other aspects are described in the following disclosure.

Some aspects include a process, including: executing, with the computer system, tasks in the workflow with AI agents; detecting, with the computer system, that a human is needed to assist with a given task among the tasks in the workflow after one of the AI agents attempts the given task; selecting, with the computer system, the human from among a set of humans based on a profile of the human and the given task and sending a message that causes the selected human to perform the given task; and receiving, with the computer system, the selected human's completion of the given task and inputting the human completion of the given task, or input, to one of the AI agents performing a downstream task in the workflow; and storing, with the computer system, a result of completing the workflow in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 2 is a process diagram illustrating an example method for operating a WTA system in accordance with some embodiments.

FIG. 3 is a block diagram illustrating example operator devices and their components according to certain embodiments as well as a partial human-machine interface ontology comprising various example means for an operator to interface with an operator device.

FIG. 5 is a display diagram illustrating one example method of an operator interacting with an operator device to input a decision, in accordance with some embodiments.

Figure 1:
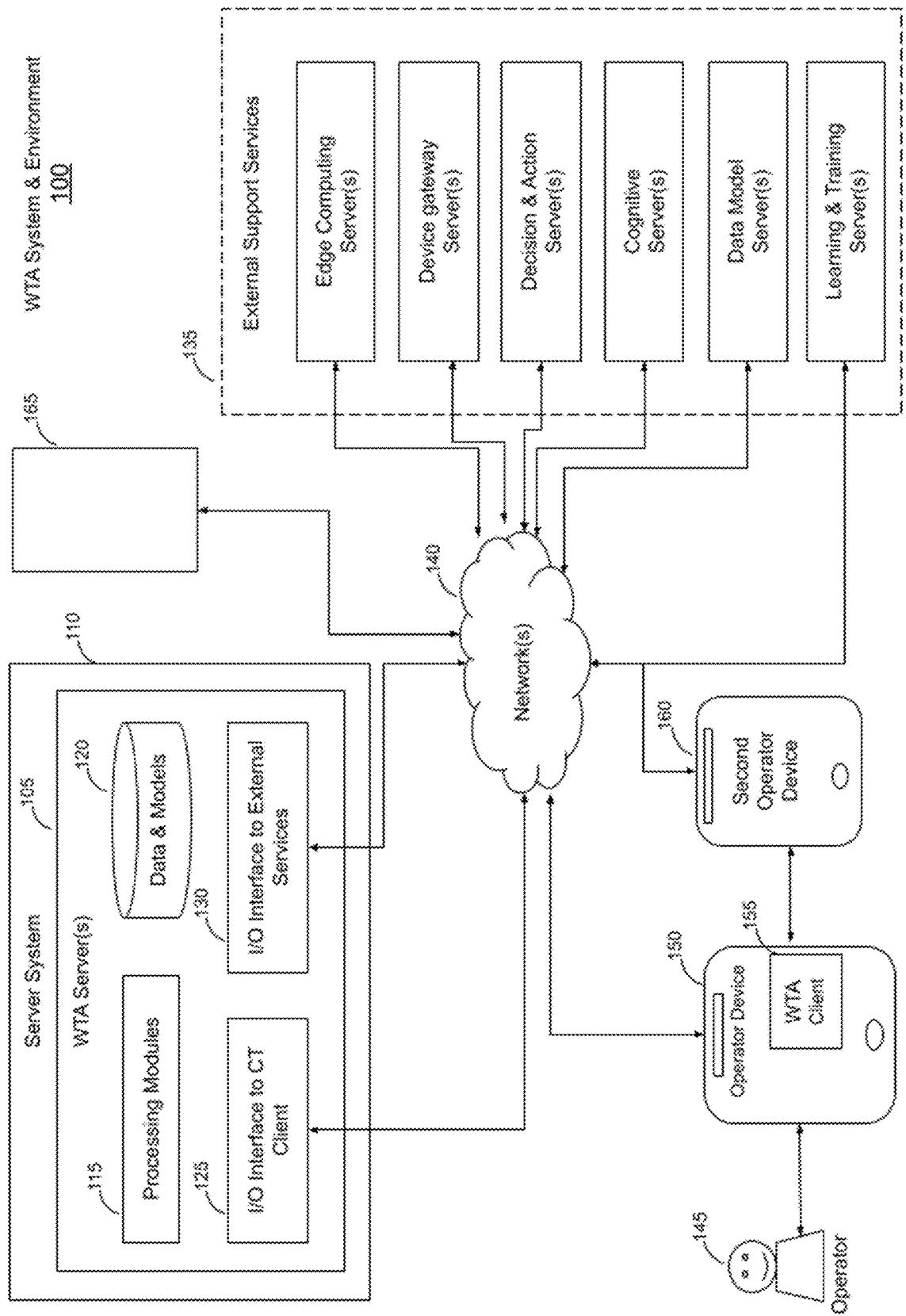
FIG. 1 is a block diagram illustrating a system and environment for a workflow task agent (WTA) according to various examples.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of AI. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some tools to provide AI agents that execute workflows, like LangChain and DSPy, are not well suited to address problems like those mentioned above. LangChain aims to serve a niche audience of highly technical developers and data scientists with tools for integrating various 3rd party LLMs (large language models) into various applications. LangChain offers an abstraction (e.g., middle) layer for facilitating LLM usage. However, the end-product functionality of applications using LangChain is beholden to the third party LLM providers which leads to poor execution performance with complex workflows (e.g., chains) due to the lack of control over the 3rd party LLMs and their APIs (application program interfaces). DSPy is a framework also designed for a niche audience of software developers, data scientists, and researchers interested in advanced application of language models, and carries a steep learning curve. DSPy aims to optimize 3rd party LLMs for more domain specific tasks. Like LangChain, DSPy is directly dependent on 3rd party LLMs, and can consume large amounts of computational resources which must be provided independently. Additionally, both technologies are beholden to any limitations in the 3rd party models that they integrate with, for example biases, errors, or the scope of knowledge. Both LangChain and DSPy require highly technical software programming and data science expertise to orchestrate meaningful workflows and output. None of which is to suggest that any such techniques are disclaimed or disavowed.

Some embodiments mitigate the above-issues with AI-related tooling, or other issues, by providing one or more of the following: a natural language interface for defining workflows; a visual interface for reviewing and iterating on workflow designs and optimizations which simplifies the design process, making it more accessible for non-technical users; components abstracting away from users complexity related to fitting the correct machine learning models for a workflow and providing for specialized models when various forms of data science are required; AI assisted interactive workflow for creating a workflow using a multi-system architecture at design time; distributed processing and scaling; customizable and extensible data handling abstracted from the workflow creator; ability for the system to prompt humans to provide decisions at key points of a workflow iteration and execution to provide the ability for the agents to run with less up-front data and training resulting in less-cost and fewer resources consumed; and a unified integration layer abstracted from the user.

Some embodiments use expertise-weighted feedback, dynamic thresholding, non-linear confidence adjustments, meta-learning, and cognitive learning, making its application in the field more specialized and powerful for complex, high-stakes tasks like fraud detection compared to the capabilities of LangChain. Some embodiments dynamically weight human feedback based on expertise, and the system may prioritize high-quality input, leading to more efficient and accurate learning. Additionally, some embodiments incorporate active learning with dynamic thresholding, allowing the AI to selectively seek human input for uncertain cases while becoming more autonomous over time. The use of a non-linear confidence factor, in some embodiments, further refines decision-making, helping the AI to adjust its confidence levels based on the expected rewards, which is particularly helpful in scenarios with variable risk, such as fraud prevention. The inclusion of meta-learning, in some embodiments, allows the AI to continuously adapt and improve based on past experiences, enhancing its ability to generalize across different tasks. Finally, some embodiments feature cost-aware ROI (return on investment) optimization, balancing accuracy, efficiency, and costs to ensure the system remains economically viable. Some embodiments are expected to be more specialized and powerful for complex, high-stakes applications like detecting and preventing fraudulent healthcare transactions, surpassing the capabilities of frameworks like LangChain, which is not to suggest that LangChain or DSPy are disclaimed or disavowed or that the present techniques could not be used in conjunction with these tools.

Some embodiments implement a sophisticated AI-driven workflow management platform. Some embodiments integrate AI algorithms that transition from reactive, task-based operations to goal-oriented processes, where AI agents autonomously work towards achieving specific objectives. These agents, in some embodiments, can dynamically reach out to a network of human experts when the AI's confidence in decision-making is insufficient, facilitating higher accuracy in workflow tasks.

The platform's architecture, in some embodiments, is designed to facilitate real-time learning and adaptation, mitigating the brittleness of traditional rule-based systems (which is not to suggest that such systems are disclaimed or disavowed). Some embodiments incorporate advanced machine learning models, such as boosted trees and LSTM (long short-term memory) models, that not only analyze transactional data but also consider the broader context of customer interactions, or other workflow-relevant data. The system, in some embodiments, supports real-time data processing and decision-making, enhanced by a subscription-based tiered model that determines the frequency of AI model retraining. The platform, in some embodiments, also provides significant configurability, allowing businesses to manage and tailor the involvement of human experts based on specific domains of expertise and service level agreements (SLAs). Some embodiments are expected to streamline the deployment process, making it as user-friendly as possible while ensuring robust fraud detection capabilities, with potential applications extending beyond healthcare payments to various enterprise-level strategic tasks.

Some embodiments are expected to mitigate or overcome the adoption, efficiency and accuracy shortcomings of existing human-agent driven machine tasking methods. Some embodiments mitigate some of those issues by providing a system, method and device for machine-driven tasking of human-agents of a business entity. More specifically, some embodiments provide the following beneficial effects for businesses and their agents (which is not to suggest that embodiments are limited to implementations providing any of these benefits or that any other description is limiting): creating trust within agents of a business entity to adopt an intelligent machine agent solution through knowing that those skilled within their organization will be making key decisions in situations where the machine(s) may not have sufficient data or where a mission critical task or safety related concern related to a task and/or group of related tasks exists; providing an efficient, effective and practical means for connecting the intelligent machine agents performing a workflow task on behalf of the business to query human-agents of the business qualified to input decisions determined necessary to continue or complete the task; further, providing a practical and low-resource means for improving intelligent agent performance over time, feeding relevant real-world data from human-agents skilled in the business entity's industry so that the intelligent agent may learn and improve its workflow-model; increasing the rate of adoption by business of intelligent machine agents to perform work on behalf of the business by accelerating creation of the aforementioned trust; and self-learning and trainable intelligent machine agents performing more daily operational work tasks faster in parallel than a human-agent can perform in serial and consuming less time and resources enables businesses to shift operational costs from low-revenue producing activities to high-revenue producing activities accretive to business growth and innovation for the community they service.

Some embodiments may provide modalities of workflow engagement with many additional beneficial effects for businesses and their human-agents, including: creating the trust within agents of a business entity to adopt an intelligent machine agent solution through knowing that those skilled within their organization will be making key decisions in situations where the machine(s) may not have sufficient data or where a mission critical task or safety related concern related to a task exists; providing an efficient, effective and practical means for connecting the intelligent machine agents performing a workflow task on behalf of the business to query human-agents of the business qualified to input decisions determined necessary to continue or complete the task; further, providing a practical and low-resource means for improving intelligent agent performance over time, feeding relevant real-world data from human-agents skilled in the business entity's industry so that the intelligent agent may learn and improve its workflow-model; increasing the rate of adoption by business of intelligent machine agents to perform work on behalf of the business by accelerating creation of the aforementioned trust; and self-learning and trainable intelligent machine agents performing more daily operational work tasks faster, and consuming less time and resources, enables businesses to shift operational costs from low-revenue producing activities to high-revenue producing activities accretive to business growth and innovation for the community they service.

In some embodiments, a system includes a mobile electronic device (e.g., cell phone, virtual reality headset, augmented reality headset, wearable smart watch, smart speaker, in-automobile computer, etc.) with multiple processing units (e.g., central processing units, graphics processing units, tensor processing units, artificial intelligence hardware accelerators, and the like), memory, human-machine interfaces, and application software connected to a system of intelligent agents over a network that act and reason autonomously, the workflow task agent system (hereafter, "WTA system"). The WTA system may run a workflow-model generating one or more tasks and/or subtasks associated with the workflow-model. Some embodiments further include the WTA system using an algorithm to generate and evaluate a trust-score for the purpose of determining when additional data is required to execute a task associated with the workflow-model, then generating both a natural language prompt (hereafter, "decision-prompt object") that represents the decision-data and any relevant information context surrounding the decision-data (hereafter, "decision-context object"). The decision-prompt object and decision-context object may be encoded into request data that can be sent and decoded by the mobile electronic device, (hereafter, "decision-request object"). The WTA system may communicate with external support services, one such service is the device gateway server which may be configured to determine which mobile electronic device(s) to send the decision-request object, using an algorithm described herein, and then send the decision-request object to one or more mobile electronic devices leveraging a suitable asynchronous messaging technology, one such example method being a "push notification" or "server-notification." The mobile electronic device may receive the message from the WTA system and decode the decision-request object to determine decisions involving input from the operator at the mobile electronic device to progress or complete a task. The decision may be input into the mobile electronic device by the operator and then transmitted back to the remote WTA system for processing to perform a post-operator decision action, progressing and/or completing the task. With some implementations of such an example system, common workflows and their tasks used for businesses to run daily operations can shift from being controlled and run by human-agents of the business over the course of a contiguous 8-hour workday to instead being controlled and run by intelligent machine agents over a 24-hour workday with on-demand assistance from human-agent operators skilled in the field working at a mobile electronic device and performing delegated key decisions.

An example embodiment includes at an electronic device having one or more processing units, one or more memories and one or more human-machine interfaces (hereafter, "HMI") including natural language, images, and video; receiving a request to query the operator at the device for a decision; receiving an input from the operator at the device from the one or more human-machine interfaces; and analyzing the input signal to formulate response data and then sending the response to a system over a network for processing.

An example mobile electronic device may include one or more processors, one or more memories, one or more human-machine interfaces configured for communicating to the operator at the device including natural language, and one or more programs that are stored in the one or more memories that can be executed by the one or more processors, the one or more programs containing instructions that can receive and decode a decision input by the operator at the mobile electronic device, present a decision prompt to an operator at the mobile electronic device, accept decision data as input from an operator at the mobile electronic device through the one or more HMI(s) connected to the device, create a decision response based on the operator input to the mobile electronic device, and send a decision response to a server and/or second electronic device for processing.

An example human-machine interface provides one or more points of interaction between humans and device(s). The one or more points of interaction allow an operator at the device to control and communicate with device(s), system(s), and the application software installed on them. Point(s) of interaction are comprised of electrified circuits controlled by a set of instructions for processing signals from audio, gesture, visual and/or tactile, wearable or implantable devices, causing an electronic device to receive a request to query the operator at the device for a decision, receiving an input from the operator at the device from the human-machine interface, analyzing the input signal to formulate response data and then sending the response to a remote system for processing. A human-machine interface can be embodied entirely in software, entirely in hardware, or any combination of software and hardware elements therein.

An example includes a workflow task agent server (hereafter, "WTA Server") with processing modules, data models, an I/O (input output) client interface, network communication module and I/O interface to external support services. The WTA server, in some embodiments, communicates with the external support services over a network. The external support services may include the edge computing server, device getaway server, decision & action server, cognitive server, data model server, and learning & training server and may be configured for assisting the workflow task agent in performing various functions including message routing, generation of a workflow-model along with associated action-model and decision-model using multimodal machine-learning and other training methods, and generative functions for augmenting data and/or producing synthetic data. The term "synthetic data" refers to data that was not obtained from real-world actual events or observations but was instead generated artificially to mimic real-world data (e.g., having the same distribution as such data). Often, synthetic data is created using algorithms or simulations to produce data for very specific needs during the training and testing of machine-learning models when real-world data such a specific need is difficult to obtain.

In some embodiments, AI agents may employ a variety of algorithms to determine actions, make decisions, or process information in pursuit of a goal. In some cases, such agents may include or shape the output of the various machine learning models described below.

In some embodiments, AI agents that perform knowledge worker tasks may employ natural language processing (NLP), knowledge representation, and reasoning algorithms to handle tasks typically associated with human expertise, such as drafting documents, conducting research, generating reports, or responding to inquiries. These agents may integrate various techniques to understand, generate, and manipulate information in a manner similar to human knowledge workers. Some embodiments may employ Transformer-based architectures, such as those described below. These architectures may use multiple layers of attention mechanisms to process textual data, enabling the AI agent to understand context, identify relationships between concepts, and generate coherent text. For instance, when tasked with drafting a document, a transformer-based agent may first encode the input prompt or topic using a multi-head self-attention mechanism that captures dependencies between words and phrases across the entire text. The encoded representations may then be decoded, generating sentences or paragraphs that reflect a sophisticated understanding of the topic. The agent may be fine-tuned using large datasets relevant to the specific domain, such as legal, financial, or technical documents, to ensure the generated content aligns with industry-specific terminology and conventions.

In some embodiments, AI agents may implement knowledge graph-based algorithms to facilitate reasoning and information retrieval. The knowledge graph may include a structured representation of entities and their relationships, enabling the agent to organize and access information in a semantically meaningful way. For example, an AI agent tasked with responding to complex customer inquiries may query a knowledge graph to retrieve relevant facts, such as product specifications, customer history, or troubleshooting steps. The agent may employ pathfinding algorithms, such as breadth-first search or depth-first search, to navigate the graph and identify connections between entities. In some embodiments, the agent may apply graph-based reasoning techniques, such as Markov Logic Networks, which combine probabilistic reasoning with first-order logic, allowing it to infer new relationships or draw conclusions based on incomplete data.

Some embodiments may implement Case-Based Reasoning (CBR) algorithms. Some example agents may solve new problems by referring to previously encountered cases. In this approach, the agent may maintain a repository of past cases, each representing a problem-solution pair. When presented with a new problem, the agent may retrieve similar cases using a similarity assessment algorithm, such as cosine similarity for textual data or Euclidean distance for numerical data in an embedding space into which past cases and a new case have been mapped. The agent may then adapt the retrieved solution to fit the current context, potentially using machine learning techniques to refine the adaptation process.

In some embodiments, agents may use automated planning algorithms, such as Hierarchical Task Networks (HTNs), to break down complex tasks into manageable sub-tasks. Some embodiments represent tasks in a hierarchical manner, with high-level tasks decomposed into lower-level actions based on predefined methods or learned patterns. For instance, an AI agent tasked with preparing a comprehensive market analysis report may first decompose the task into sections such as data collection, trend analysis, and report generation. Each sub-task may be further decomposed until it reaches a level of granularity suitable for execution by the agent. The agent may then sequentially or concurrently execute these sub-tasks, dynamically adapting the plan as new information is acquired or as subtasks are completed.

Additionally, AI agents may employ ensemble learning algorithms to combine multiple models' predictions or outputs, enhancing overall performance and reliability. For example, an agent responsible for drafting legal documents may employ an ensemble including a language model fine-tuned on legal texts, a logic-based reasoning module for ensuring coherence and accuracy, and a retrieval-based model that sources relevant case law or statutes. The ensemble may aggregate these components' outputs using voting mechanisms or weighted averaging to produce a comprehensive, high-quality document.

In other embodiments, reinforcement learning algorithms may be applied to optimize the agent's performance over time. An AI agent performing knowledge work may be designed to interact with a human supervisor who provides feedback on the agent's output quality, which the agent uses as a reward signal. For example, an agent tasked with writing financial summaries may generate an initial draft that is then reviewed by an expert who provides feedback on accuracy, completeness, or style. Based on this feedback, the agent's reinforcement learning algorithm, such as Proximal Policy Optimization (PPO), updates the policy guiding the generation process, refining the agent's performance with each iteration.

Some embodiments may implement ontology-based systems to formalize domain knowledge, allowing the AI agent to reason about complex concepts within a specific field. An ontology represents a set of concepts, categories, and relationships in a domain, serving as a structured framework for understanding domain-specific knowledge. For example, an AI agent engaged in medical research might use an ontology representing diseases, symptoms, treatments, and their interrelationships. This structure may help the agent to draw inferences, such as identifying potential treatment options for a newly diagnosed condition by recognizing patterns in related cases or published studies.

Some embodiments may incorporate multi-agent systems (MAS) to handle complex tasks collaboratively. In this context, multiple AI agents with specialized expertise may interact, exchange information, and collectively solve problems. For example, a multi-agent system tasked with managing a large-scale research project may include agents specializing in literature review, data analysis, and report synthesis. These agents may communicate via message-passing protocols or a shared knowledge base, coordinating their efforts to achieve the overarching project objectives.

Some example agents may implement the Q-learning algorithm. Some examples may use a model-free reinforcement learning technique. In this approach, an AI agent may iteratively update a Q-table, which stores Q-values representing the expected cumulative reward for taking a particular action in a given state. In each iteration, the agent may start in a given state and select an action based on an exploration-exploitation policy, such as the epsilon-greedy strategy, which involves choosing either a random action (exploration) or the action with the highest known Q-value (exploitation) with a certain probability. After taking the action, the agent transitions to a new state and receives a reward signal. The Q-value for the state-action pair may be updated based on the received reward and the maximum Q-value of the subsequent state.

In other embodiments, AI agents may employ deep reinforcement learning using deep Q-networks (DQNs). DQNs may extend Q-learning by approximating the Q-value function with a neural network. The neural network may take a state as input and produce Q-values for each possible action. During training, experiences consisting of state, action, reward, and next state tuples may be stored in a replay buffer, allowing the agent to sample mini-batches of experiences to update the network weights using backpropagation. The target Q-value may be computed using a target network, which is a periodically updated copy of the main Q-network, helping to stabilize training.

Another approach that some embodiments may implement involves the use of Monte Carlo Tree Search (MCTS). MCTS may be employed for decision-making in environments where the agent must plan several moves ahead. The algorithm may involve four steps: selection, expansion, simulation, and backpropagation. During selection, the agent may traverse the current tree of possible actions from the root node using a policy such as Upper Confidence Bound for Trees (UCT), which balances exploration and exploitation. Expansion occurs when a leaf node is reached, and a child node is added to represent a potential future state. Simulation, often called "playout," involves randomly selecting actions from the newly added node until reaching a terminal state, at which point a reward is calculated. Backpropagation then updates the values of all nodes traversed in the path to reflect the simulated outcome. This process may be repeated multiple times, allowing the AI agent to build a comprehensive understanding of which actions are expected to yield the most favorable results.

In some embodiments, evolutionary algorithms such as Genetic Algorithms (GAs) may be used to guide AI agents toward optimal policies or solutions. A population of candidate solutions may be initialized, each represented as a genome, such as a vector of weights for a neural network. Each candidate is then evaluated according to a fitness function that measures its performance in the given environment. Through processes that mimic natural selection, such as crossover (combining parts of two or more genomes) and mutation (randomly altering elements of a genome), new candidates are generated. Over successive generations, the population is expected to evolve toward higher fitness, allowing the AI agent to refine its strategies or decision-making capabilities.

In some embodiments, agents may employ behavior-based algorithms, such as Subsumption Architecture. In some embodiments, behavior modules operate concurrently, with each module designed to handle a specific task or objective. Modules may be organized into layers where higher-priority behaviors may override or subsume lower-priority ones.

In some cases, different agents may have different specialties. Some embodiments may select among these agents with a variety of techniques. In some embodiments, a mixture of experts model may employ various algorithms to route inputs to the most appropriate specialized agents for processing. Some embodiments may include a gating network that determines how to allocate input data to one or more of these agents. The routing process may involve selecting a subset of agents based on the input characteristics, ensuring that different portions of the input space are handled by agents with the most relevant capabilities. In some cases, these routing approaches may be used both to select among AI agents and human experts.

One approach to routing is the use of a soft gating mechanism. In some embodiments, the gating network may generate a probability distribution over all experts for each input. In some cases, the gating network is a feedforward neural network that takes the input vector and produces a set of weights, each representing the relevance or importance of a particular agent for that input. The outputs from the experts may then be combined using a weighted sum, where each agent's output is multiplied by the corresponding weight from the gating network. This approach may allow for collaboration among agents, as multiple agents may contribute to the final output in proportion to their relevance.

In some embodiments, a hard routing mechanism may be employed. In some embodiments, the gating network selects a fixed number of agents for each input rather than distributing the input across all agents. Some embodiments use a top-k selection strategy, where the gating network produces scores for each expert, and only the top k experts with the highest scores are selected to process the input. This method may be implemented using an argmax operation to identify the agents with the highest scores, followed by a masking operation to ensure that only these agents contribute to the final output. The hard routing approach may reduce computational costs by limiting the number of active agents, which is especially advantageous in large-scale models.

Another routing algorithm that may be used in some embodiments involves load balancing, which aims to distribute inputs evenly across agents to prevent overloading certain agents while underutilizing others. In this context, an entropy regularization term may be added to the loss function during training to encourage the gating network to generate a more balanced distribution of inputs across agents. Alternatively, an auxiliary loss function may be introduced, which penalizes the gating network for selecting the same agents repeatedly, thereby encouraging it to explore other agents.

In some embodiments, reinforcement learning algorithms may be employed to optimize routing decisions dynamically. For instance, the gating network may be treated as an agent in a reinforcement learning environment, where the other agents represent the available actions. The gating agent receives a reward signal based on the quality of the overall model's performance for each input processed. Over time, the gating agent may learn to make routing decisions that maximize cumulative rewards, thereby optimizing the allocation of inputs to the most appropriate experts. Proximal Policy Optimization (PPO) or Q-learning algorithms may be used to train the gating network in such reinforcement learning-based approaches.

Another algorithm for routing involves using sparse routing techniques. In some cases, only a small fraction of agents are activated for each input. The Switch Transformer model, for example, may be used. Some embodiments may implement a routing approach where the gating network selects a single agent for each task in a sequence. This method may use a gating network that performs a sparse selection, directing each task to the most suitable agent while ensuring that only one agent processes each task, significantly reducing computational requirements.

Some embodiments may implement a k-means clustering algorithm as part of the routing strategy. In this scenario, agents may be treated as centroids in a high-dimensional feature space (e.g., an embedding space), and the gating network may assign each input task to the nearest agent based on the Euclidean distance, cosine distance, or other distance metrics. During training, the centroids (representing the agents) may be updated iteratively to minimize the distance between assigned inputs and their respective experts, ensuring that each agent becomes increasingly specialized in handling a particular subset of the input space.

Further, in some embodiments, routing may be performed using attention-based mechanisms, where an attention layer serves as the gating function. The input is used to compute attention scores over the agents, and these scores determine the extent to which each agent contributes to the final output. This attention-based routing may allow for dynamic and flexible allocation of inputs to agents, as the routing decisions may be adjusted based on the specific characteristics of each input.

Some embodiments may route tasks to agents with entropy-based gating. Some embodiments may minimize uncertainty in the routing decisions. The gating network may incorporate an entropy minimization objective, encouraging it to make more confident, deterministic choices about which experts to engage. For instance, the gating network might output logits representing the suitability of each expert, and a softmax function with a temperature parameter may be applied to control the sharpness of the resulting distribution. By adjusting the temperature parameter, the routing can shift from a more probabilistic (soft) approach to a more deterministic (hard) one.

In some embodiments, hierarchical routing algorithms may be implemented, where the agents themselves are organized in a multi-level structure. In this case, the gating network first selects a subset of agents at the top level, which in turn may route the input to more specialized agents at subsequent levels.

An example workflow-model may include a multimodal machine-learned model program instructions and data which can be run in WTA server memory on a local or cloud hosted server system provided by a third party. A workflow-model may be configured for relating and/or generating one or more tasks and actions associated with the workflow-model for the WTA server to execute, the one or more tasks having an associated trust-score, the associated trust-score which can be evaluated based on configuration data to enable a determination by the WTA server on whether additional data is needed to perform a generated task during task execution, generating decision data that can be used by the WTA server to create a decision prompt using natural language.

An example machine-learned model may be configured for training and learning patterns from historical data by adjusting its internal configuration using training data and one or more algorithms, making predictions based on new or unseen data and providing outputs based on the patterns learned during training. Some embodiments can self-regulate and validate its internal configuration, can understand and generalize its model while being run, use knowledge from a previously trained model to boost performance on a related task (transfer learning), adjust to new data patterns over time, learn while being run, and provide insights into the models decision-making process. The term "multimodal" is used to describe a machine-learning technique incorporating various types of data together during the machine-learning process in a complimentary manner, for example, combining video, audio, and text data.

An example system may be configured for generating and storing a workflow-model, loading and running tasks related to the workflow-model, determining whether decision data is necessary to progress or complete a workflow-model task leveraging a trust-score, encoding a decision-prompt for an operator at a mobile electronic device using natural language, generating decision-context object related to the decision and encoding the decision-context object and decision-prompt object into a decision request, determining the best qualified operators to provide the decision data within a configured domain, sending the decision-request object over a network to one or more best qualified operators registered within that configured domain, receiving and decoding the decision-request object at an mobile electronic device, authentication of the operator at the mobile electronic device, presenting the operator at the mobile electronic device with a natural language prompt including the decision-request object and decision-context object, requesting an operator at an mobile electronic device to input decision data through one or more human-machine interfaces at the mobile electronic device, encoding the operator decision data into a decision-response object and sending it back over the network to be processed by a second device, receiving and decoding the decision-response object, processing the decision-response object data and progressing and/or completing the related task within a workflow-model, using the decision-response object data to learn and train the workflow-model, and monitoring, analyzing and reporting on workflow-model execution.

The term "input" may be in some examples an "output" and vice-versa, or may be both an input and an output in other examples. The term "decision" as used herein may be construed to be an action or process requiring consideration, guided judgment, and/or resolution of question to arrive at a conclusion. The term "if" may be construed to mean "when" or "upon" or "in response to detecting," depending on the context.

The term "operator" as used herein may be construed generally to be a user at an electronic device who interfaces with such a device through one or more suitable methods, and more specifically a human-agent of a business entity who performs work for the benefit of such a business entity. For the purpose of this disclosure, examples of an "agent" of a business entity include employees, principals, independent contractors or any other relationship between a person and a business entity where work is performed on behalf of or for the benefit of the business entity and/or person. A "human-agent" of a business is a specialization of the defined term agent above and refers to a natural person, a human who is an agent of a business. An operator may have expertise in one or more domains, capable of making decisions delegated by a system of intelligent machine agents operating a workflow-model in that domain.

1. System & Environment

FIG. 1 is a block diagram illustrating a system 100 according to various examples. In some examples, system 100 can implement a WTA system. WTA system can be, for example, a machine-supervised system configured to formulate a set of decisions to be made for the purpose of completing a task, organize the decisions and determining when and where the decisions should be delegated within a network of operators at an operator device, then prompt the operator at an operator device to input a decision using any human-machine interface, examples of which are described in paragraphs that follow, so that the system can progress or complete the task. In some embodiments, a WTA system can be capable of autonomously prompting an operator to input a decision, accepting that decision data at a mobile electronic device in an audio, visual, tactile, or other suitable form input by the operator at the device.

As shown in FIG. 1, in some examples, a WTA system can be implemented using a client-server architecture. The task engine can include a client-side portion 155 (hereafter, "WTA client 155") executed on operator device 150 and server-side portion 105 (hereafter, "WTA server 105"). WTA client 155 can communicate with WTA server 105 through one or more networks 140, examples of which are further provided below. WTA client 155, in some embodiments, can provide client-side functionalities such as operator-facing input and output processing and communication with the WTA server 105. WTA server 105, in some embodiments, can provide server-side functionalities for any number of WTA clients 154 each residing on a respective operator device 150.

In some examples, WTA server 105 may include one or more processing modules 115, data and models 120, an I/O interface for client facing communication 125 and an I/O interface to external support services 130 to communicate with one or more external support services 135. The one or more processing modules 115, in some embodiments, utilize the data and models 120, and, in some examples external support services 135 to formulate, organize and manage decisions needed to complete specific task(s).

Server system 110 may be implemented on one or more data processing apparatus or a distributed network of computers. In some examples, server system 105 may also employ various virtual devices and/or services of third-party providers (cloud service or edge service providers) to provide the underlying computing resources and/or infrastructure resources of server system 110.

In some examples, server system 110 can connect to a second server system 165 for the purpose of processing data and running programs.

In some examples, WTA server 105, and WTA client 155 can be configured and installed on a single device without the need for separate client-side and server-side components, or on multiple devices. Further, the division of functions between WTA server 105 and WTA client 155 may vary in different implementations.

In some examples, WTA server 105, and external support services 135 can be configured and installed on a single device. Further, the division of functions between WTA server 105 and external support services 135 may vary in different implementations, which is not to suggest that other described techniques cannot also vary.

In some examples, operator 145 can be a user, controller and/or owner of the mobile electronic device receiving prompts for decision input and can be a human-agent of a business entity, skilled in one or more professional fields related and relevant to the business, interfacing with the application software on the device using one or more human-machine interfaces.

In some examples, the process can be designed as illustrated in the WTA system process diagram 200 in FIG. 2 where the system (such as that of FIG. 1) is able to determine decisions that are required to complete a pending task 205. Examples of pending tasks include discrete units of work that move from a beginning point to an ending point over a period of time, in either a sequential or non-sequential order, in a linear or nonlinear progression. The system, in some embodiments, then determines which operator is best qualified to make the decision 210, and sends a digital message asynchronously to the devices associated with the operator 215 over the network. Once the message arrives at the operator device, in some embodiments, a notification on the device prompts the operator to input a decision 220. The operator, in some embodiments, inputs their decision using one or more available human-machine interfaces on the device 225, and the operator device then sends the data associated with the decision back to the system for processing 230. Upon receiving the decision data from the operator device, in some embodiments, the system can progress or complete the pending task associated with the decision 235, and can perform any set of actions associated with task completion 240.

Figure 6:
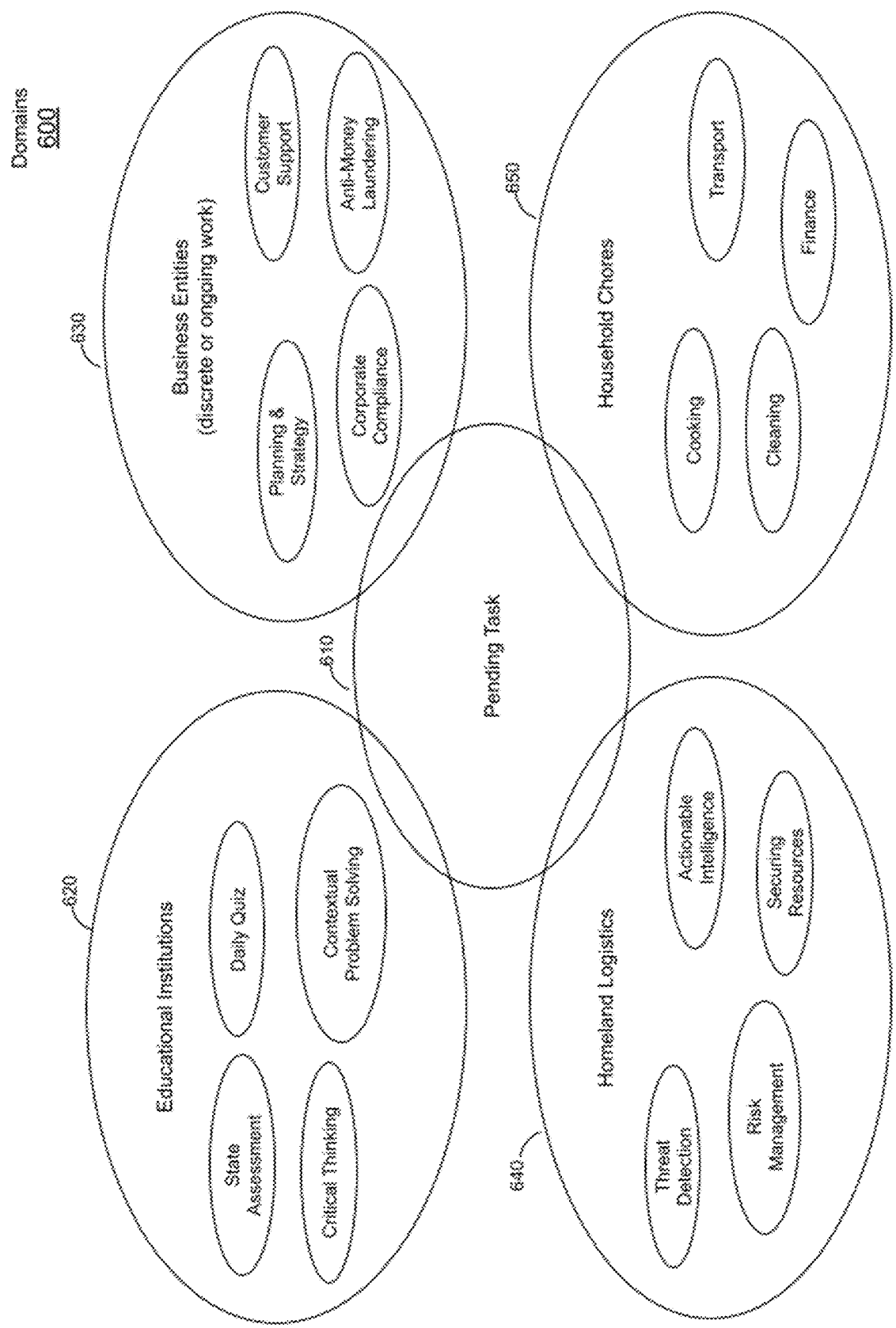
FIG. 6 illustrates an example portion of a WTA system domain ontology, in accordance with various examples.

A pending task can be associated with one or more domains as illustrated in FIG. 6, Domains 600 and further described herein. In one example, a pending task can be associated with a business entity that has enlisted the WTA system to perform work as illustrated in 630. A business entity, in some embodiments, may divide its human-agents into one or more partitions or logical grouping using domains for the purpose of representing various departmental or other organizational constructs, and/or fields of skill. Furthermore, a business entity may use domains to represent various competency or performance levels of their human-agents, enabling means for "best qualified" operators to make decisions based on the complexity or difficulty of the workflow-model executed by WTA system. To further illustrate this example, such a business entity may obtain revenue by brokering monetary payment transactions for their customers, and may have a distributed workforce of employees and/or consultants who are considered professionals in their fields of work and art. In such an example, the business entity can use the WTA system as an (machine) agent of its business to execute many common tasks associated with daily operations. To further this example, the WTA system controls and manages the execution of the tasks, however it may be necessary to have one or more professionals within the business make decisions or answer critical questions for the system in the process of task completion to improve accuracy of the tasks performed and increase adoption in the field.

In another example 620, a pending task can be associated with an educational and/or instructional institution domain such as a school or college whereby agents of the institution, or its controlling board, use the WTA system to assist with learning assignments and/or testing exams for the students. The WTA system may determine which decision to send to operator devices based upon the grade and/or ("or" s are non-exclusive herein, unless indicated otherwise, regardless of whether the term "and/or" is used elsewhere) skill level of the student, the previous questions answered by a student, and/or any other suitable criteria.

In another example 640, a government entity may use the WTA system as an agent to perform tasks in a domain associated with protecting the State. The System, in some embodiments, is configured with access to data necessary to execute tasks necessary to monitor the safety of the State. In furtherance of this example, key decisions of various magnitude and scope may need to be delegated by the WTA system to the human-agent so that the WTA system can adequately execute tasks with sufficient and necessary ethical constraint.

In another example, household chores domain 650, persons can use the WTA system to execute routine or ad-hoc personal chores on their behalf, such as procurement of food, home goods, or regular home maintenance. Operator devices associated with household members, in some embodiments, can be registered with the system and configured to make decisions regarding various programmable subdomains, for example, finances, cooking, cleaning, or any other suitable subdomains.

Examples of communication networks 140 can include local area networks LAN and wide area networks WAN wide-area networking (e.g., the Internet). Communication networks can be implemented using any known network protocol including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), cellular networks like 4G LTE and 5G, Wi-Fi networks and WIMAX, Bluetooth and NFC for personal connectivity, VoIP services, peer-to-peer (P2P), the Internet of Things (IoT) connecting smart devices, blockchain networks (e.g. for secure and transparent payment transactions). Transport mediums can be implemented using any known method including high-speed fiber-optic connections, satellite communications for global coverage, cloud computing infrastructure services, cable television networks, resilient mesh networks, edge-computing networks, and/or any other suitable communication medium.

2. Operator Devices

Operator device 150 in FIG. 1 can be any suitable electronic device. For example, an operator device can be a stationary multifunctional device or a portable multifunctional device, examples of which are illustrated in FIG. 3 and further described herein. A stationary multifunctional device, for example, can be a desktop computer 315, gaming station, television set-top box. Further, in some examples, a portable multifunctional device can be a personal electronic device such as a laptop computer 320, tablet 310, mobile phone 305, or other suitable personal electronic device. In some embodiments, an operator device system (hereafter, "operator device system 375") can include processing units, auxiliary storage, memory, networking, human-machine interfaces, I/O interfaces, display, power management, and security components. It is understood by persons of skill in the art that the functional blocks described in 325 and operator device system 375 are, optionally, combined or separated into subblocks to implement the principles of the various described embodiments. Therefore, the description herein optionally supports any possible combination or separation or further definition of the functional blocks defined herein, which is not to suggest that other descriptions are limiting. For example, the operator device system 375 in FIG. 3 can have memory 379 that is coupled to the display.

In some examples, operator device 150 in FIG. 1 can be configured to communicate requests for data through a second operator device 160 via a direct communication connection, a wired or wireless network using NFC, Bluetooth, and/or other suitable methods, often referred to as "tethering" or a "proxy" connection. The second operator device 160 can be the same or similar device to the operator device 150. With such a configuration, the second operator device 160, in some embodiments, can be used as a proxy between operator device 150 and the WTA server system 105. Such an example configuration can allow the system and operators therein to improve communication capabilities and/or overcome low-battery power challenges that can arise with mobile electronic devices. In some examples, system 100 can include any number and type of operator devices configured in such a manner to communicate with the WTA server system 105.

In some embodiments, operator device 150 in FIG. 1 may have one or more human-machine interfaces (hereafter, "HMI 325"), examples of which are illustrated in FIG. 3, suitable for accepting decision input from the operator at the device. For example, the operator device can include a tactile input system, tactile 330, sometimes called a "touch screen", consisting of a display screen, sensors, processing units, and associated programming instructions that allow the operator to input a decision into the device by using physical contact and/or movement. In furtherance of this example, the operator at the operator device can touch and/or move their hand across the operator device display screen, in accordance with the instructions provided by the operator device on the display screen, to interact and communicate with the operator device for the purpose of inputting a decision. An example of what this operator interaction can look like with the operator device is illustrated in FIG. 5.

In another example of a human-machine interface, the operator device can include a system consisting of a camera, sensors, neural networks, processing units, and associated programming instructions that can detect, process, and classify visible patterns of light, or the absence therein, vision 335, sometimes called "computer vision". Such a system, in some embodiments, can classify an identified pattern of light as an object, allowing the system to "see" objects in the real world through the camera. In this example, the operator can interact with the operator device by changing a facial expression. In this example, the operator can interact with the operator device by changing a facial expression. A multi-modal approach may be taken that combines convolutional neural networks (CNNs) to automatically learn features from images and video, along with (or in the alternative using) vision transformers (ViTs) which divide an image into discrete fixed-sized segments and embed them linearly such that they can be processed using self-attention mechanisms. This approach is expected to lead to superior performance on complex image classification tasks, particularly when trained with large scale datasets.

In another example of a human-machine interface, the operator device may include a system consisting of a microphone, speaker, sensors, neural networks, processing units, and associated programming instructions that can detect, process, classify, formulate and output speech, voice 340, sometimes called "speech or language recognition". Such a system may allow the operator device to speak language audibly to the operator and understand and respond to language spoken by the operator. In this example, the operator can interact with the operator device by audibly responding with voice to provide a decision.

In another example of a human-machine interface, the operator device can communicate with a second system, a wearable device, including a display, processing unit, sensors, network connectivity, and associated programming instructions that can itself incorporate tactile 330, vision 335, voice 340, wearable 345, implantable 350, biometric 360, and/or other suitable methods of human-machine interaction, or any combination therein. The operator device may receive decision data from the wearable device over a network. In furtherance of this example, the operator can have been wearing one or more wearable devices such as a watch with movement detection and eyewear with vision tracking, which, in some embodiments can further extend the input capabilities of the operator device to accept decision inputs from the operator.

In another example of a human-machine interface, the operator device may communicate with a second system, an implantable device, consisting of a processing unit, sensors, network connectivity, and associated programming instructions which is placed inside a human body, implantable 350, sometimes called a "BCI" or "human implantable microchip". The operator device, in some embodiments, can receive decision data from the implantable device over a network. In furtherance of this example, the operator can have one or more implantable devices which provide decision data, in whole or in part, to the operator device. In furtherance of this example, the implantable HMI device can communicate brain signals, that include decision data, from the operator device to the operator device.

In another example of a human-machine interface, the operator device can include a biometric system consisting of a processing unit, sensors, and associated programming instructions that can identify an operator uniquely sometimes called "biometric sensors" 360. In furtherance of this example, the operator device can include a biometric system that can be used by the operator device to identify and validate fingerprints of the operator, allowing the operator to input decision data.

In furtherance of the examples above, the operator device may include any combination of the HMI examples illustrated in 325. For example, in one embodiment, the operator device can include voice 340, vision 335, implantable 350, and biometric 360 HMIs that allow the operator to audibly speak the decision answer into the device, whereby the implantable device is able to communicate a heart rate signal to derive a quantified confidence level around the decision, and further the operator device is able to authenticate the operator using human eye recognition, and further the operator device is able to request a fingerprint from the operator as a secondary factor of authentication for the decision.

3. Workflow Task Agent System

In some embodiments, a workflow task agent system, WTA system 100, may be implemented according to the diagram in FIG. 1, including a client-side component, WTA client 155, and a server-side component, server system 110, which are able to communicate with one another over a network 140. Both the client-side and the server-side components may be implemented using both hardware and application software. In one example, WTA client 155 can be implemented on any suitable operator device and the server-side component, server system 110, can be implemented on one or more workflow task agent server, WTA server 120, which can be run on physical or virtual service host in a cloud and/or edge platform on a network 140 such as the Internet, using one or more 3rd party service host providers.

Figure 10:
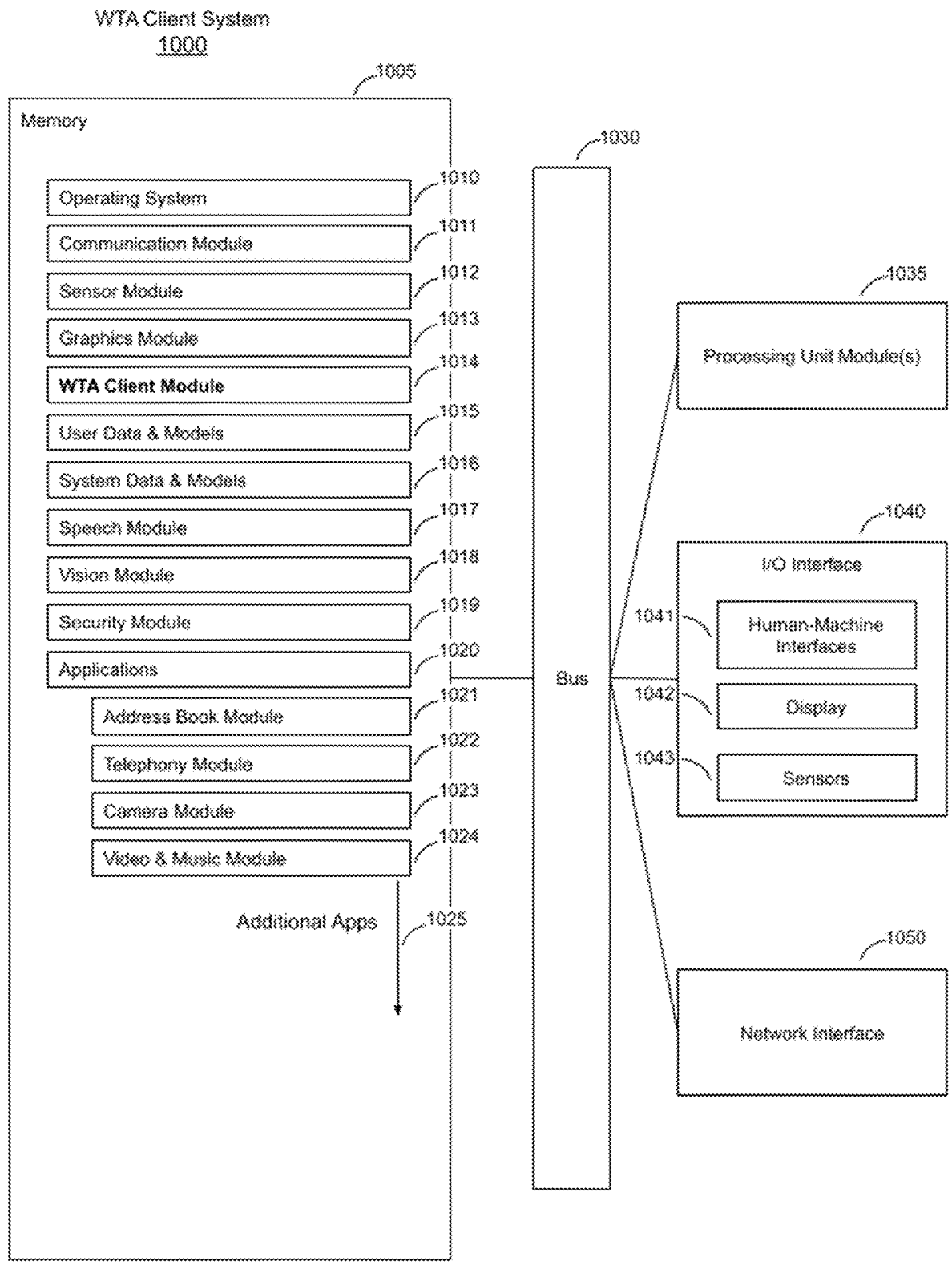
FIG. 10 is a block diagram illustrating an example computing device, such as a personal electronic device, implementing the client-side portion of an example WTA system, in accordance with various examples.

According to some examples, the WTA client can be implemented using the functional components illustrated in FIG. 10 leveraging an operator device. For example, a system containing one or more processing units 1035 which can include a central processing unit "CPU", a graphics processing unit "GPU" and/or a tensor processing unit "TPU," that may communicate through a communication bus 1030 to computer memory 1005 where the WTA client module 1014 resides. The WTA client may be able to communicate with the device operator, specifically the human business agent, through the I/O interface 1040, using one or more human-machine interfaces 1041, a display 1042 and sensors 1043. The WTA client may be able to communicate with the WTA server using the network interface 1050. The processing unit module(s) 1035, I/O interface 1040, network interface 1050 and memory 1005 may be able to communicate with each other through the communication bus 1030. One method of organizing the memory 1005 containing the WTA client module is described below: An operating system 1010 with instructions and data for managing the operating flow of the operating device; a communication module 1011 with instructions and data for interfacing with peripheral devices through the communication bus 1030; a sensor module 1012 which instructions and data for encoding and decoding signal data from the sensors 1043 including audio, motion etc.; a graphics module 1013 with instructions and data for visual graphical displays; the WTA client module 1014, which in some examples resides integrated directly with the operating system; user data and models 1015 which are used by the WTA client module 1014 to support the client-side task flow; system data and models 1016 which are used by the WTA client module 1014 to support the client-side task flow; speech module 1017 which contains instructions and data for encoding and decoding audio signals, including natural language processing on the client leveraging the I/O interface 1040, which can be used by the WTA client module 1014 to support the client-side task flow; vision model 1018 which is used by the WTA client module 1014 to support the client-side task flow; and a security module 1019 containing instructions and data used to protect data and authenticate operators using various cryptography algorithms.

Various applications may be run on operator devices. For example, an operator device such as a mobile phone may have an address book application 1021, telephony application 1022, camera application 1023, a video and music application 1024 and one or more additional applications installed on the device 1025. In some examples, the workflow task agent client module 1014 can be integrated as a program application within the additional apps 1025.

Figure 12:
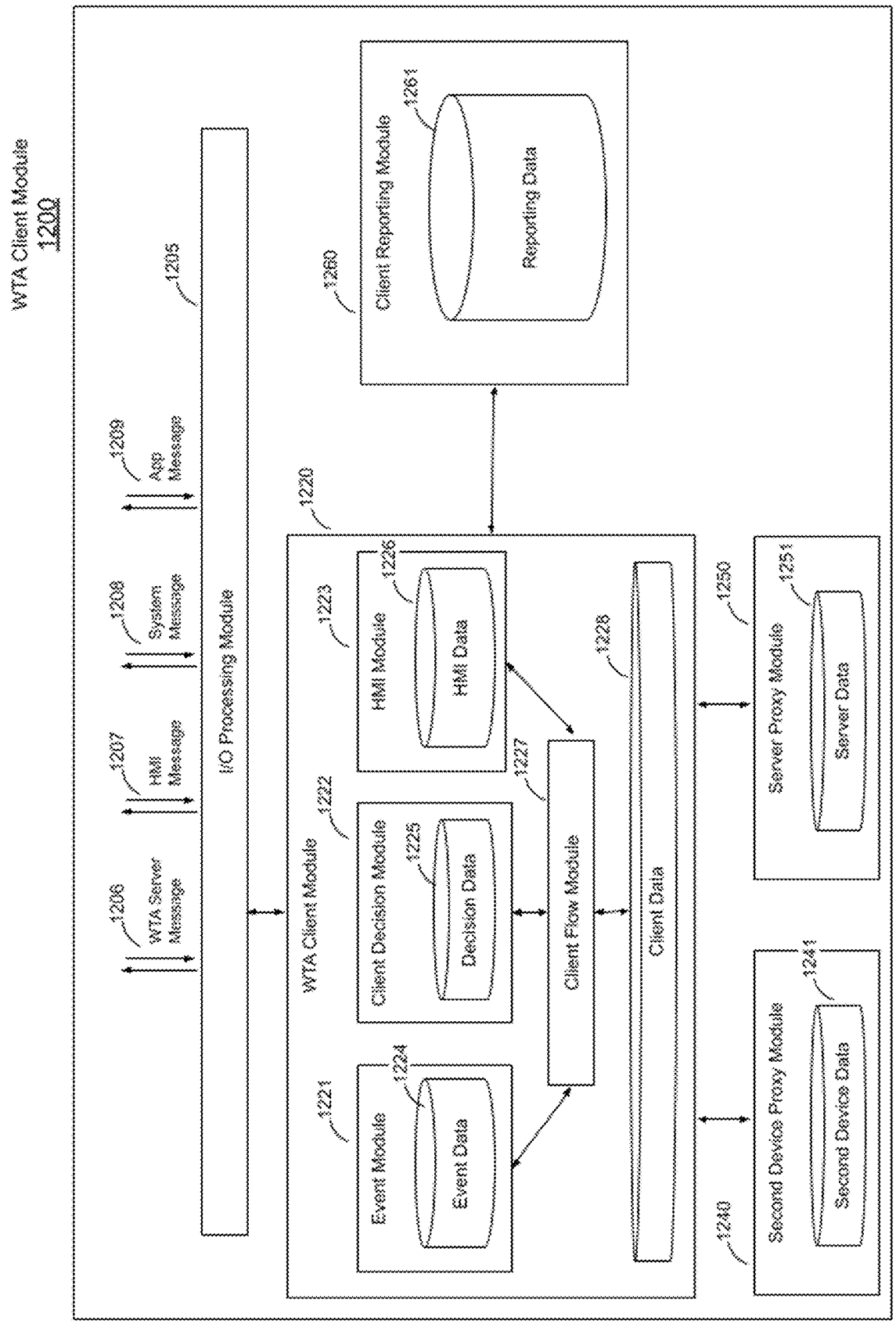
FIG. 12 is a block diagram illustrating an example WTA system, or client portion thereof, in accordance with various examples.

According to some examples, the functional components including WTA client module 1014 in FIG. 10 may be implemented as WTA client module 1200 illustrated in FIG. 12. WTA client module 1220 may be configured for creating and managing its subsystems, specifically event module 1221 may be configured for orderly sequencing and execution of decision-request objects, decision-response objects and associated event data, client decision module 1222 may be configured for encoding, decoding and processing of decision-request objects and decision-request objects along with their owned components, and related data, HMI module 1223 may be configured for encoding, decoding, and processing of data related to inputs and outputs from a touch screen interface, natural language audio interface and any other suitable peripherals systems for purpose of operator and device interface, client flow module 1227 may be configured for managing the orchestration of the aforementioned WTA client module 1220 subsystem modules and their related data for the purpose of end-to-end execution of the decision request process and decision response process flows. Client data 1228 may be configured for securely storing process flow model data, client authentication data, and other data related configuration data necessary to execute functional operations of WTA client module 1220 and its collective subsystem modules. Second device proxy module 1240 may be configured for managing the API and related communication data to a second electronic device for the purpose of using the second device network as a means of communication redundancy to and improve overall resiliency of the system. Server proxy module 1250 may be configured for managing the API and associated communication data, server data 1251, to WTA server, enabling the WTA client module to interact with one or more WTA server(s) over a network. Client reporting module 1260 may be configured for collecting and providing raw, processed, and/or partially processed client data, stored and accessed from reporting data 1261, for the purpose of monitoring and analysis by one or more external system(s). I/O processing module 1205 may be configured for processing and managing incoming and outgoing messages, including WTA server message 1206 containing data exchanged that can be understood between the WTA client and the WTA server, HMI message 1207 containing data exchanged that can be understood between the WTA client and available human-machine interfaces (e.g. interfaces for the device and operator to communicate) for the purpose of an operator decision prompt at the device and the operator decision input into the device, operator system message 1207 containing data exchanged that can be understood between the WTA client module and its host operating system for purpose of general operating system operations, and application message 1209 that containing data exchanged and understood between the WTA client and other applications running on the device and/or a second device.

Figure 9:
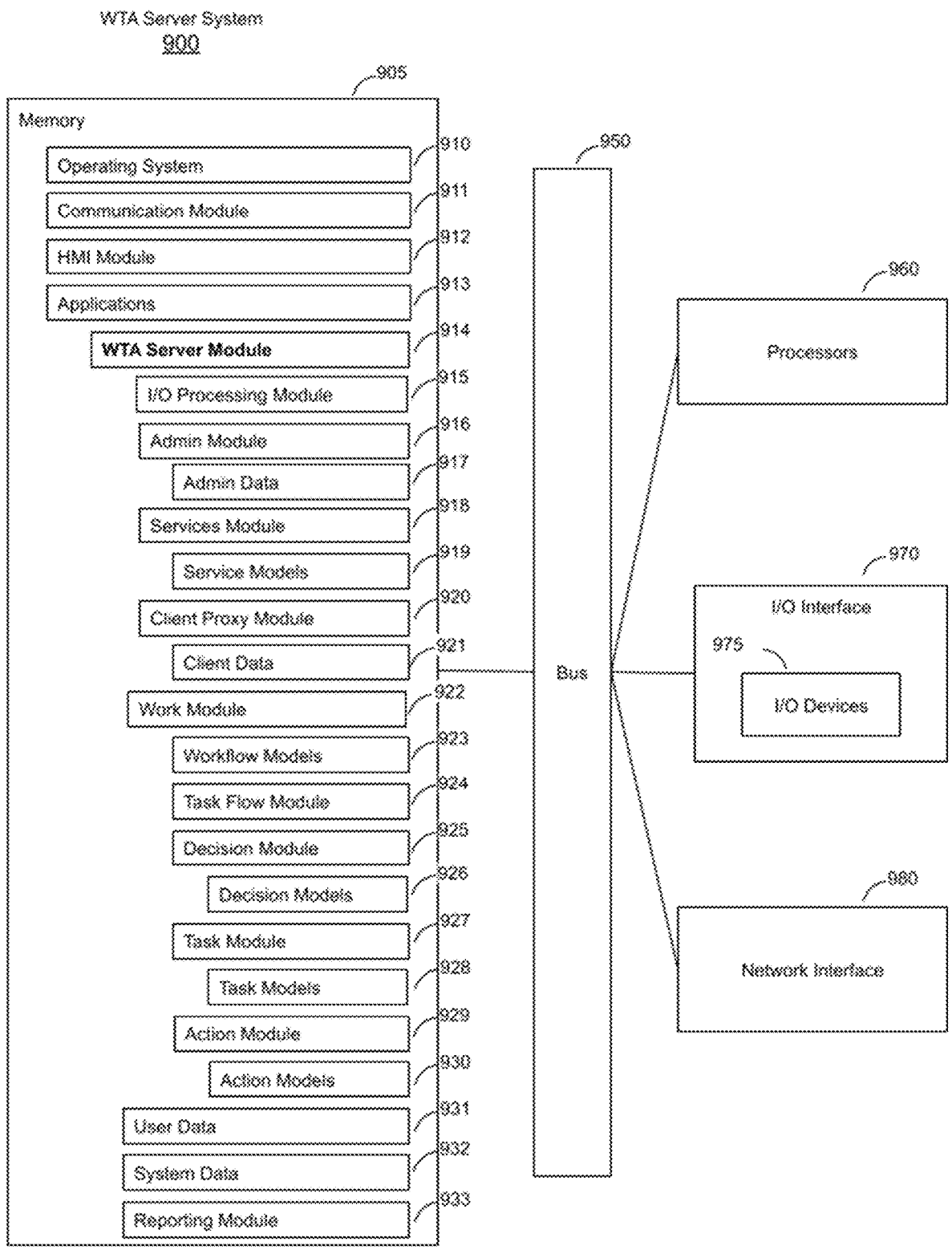
FIG. 9 is a block diagram illustrating an example WTA system, or server portion thereof, according to various examples.

According to some examples, the WTA server may be implemented using the functional components illustrated by WTA server system 900 in FIG. 9. For example, a system containing one or more processors 960 which can include a central processing unit "CPU", a graphics processing "GPU" and/or a tensor processing unit "TPU", that can communicate through a communication bus 950 to computer memory 905 where the WTA server module 914 resides. The WTA server may be able to communicate with the WTA client and other external services such as the external support services 135 in FIG. 1 through the network interface 980. The processors 980, I/O interface 970, network interface 980 and memory 905 may be able to communicate with each other through the communication bus 950. One example method of organizing the memory 900 containing the WTA server module is described below: an operating system module 910 with instructions and data; a communication module 911 with instructions and data; an HMI module 912 with instructions and data; applications 913 with instructions and data for various applications run by the WTA server; WTA server module 914 with instructions and data; I/O processing module 915 with instructions and data; admin module 916 with instructions and data; services module 918 with instructions and data; client proxy module 920 with instructions and data; work module 922 with instructions and data; user data module 931 with instructions and data; system data module 932 with instructions and data; reporting module 933 with instructions and data.

Figure 7:
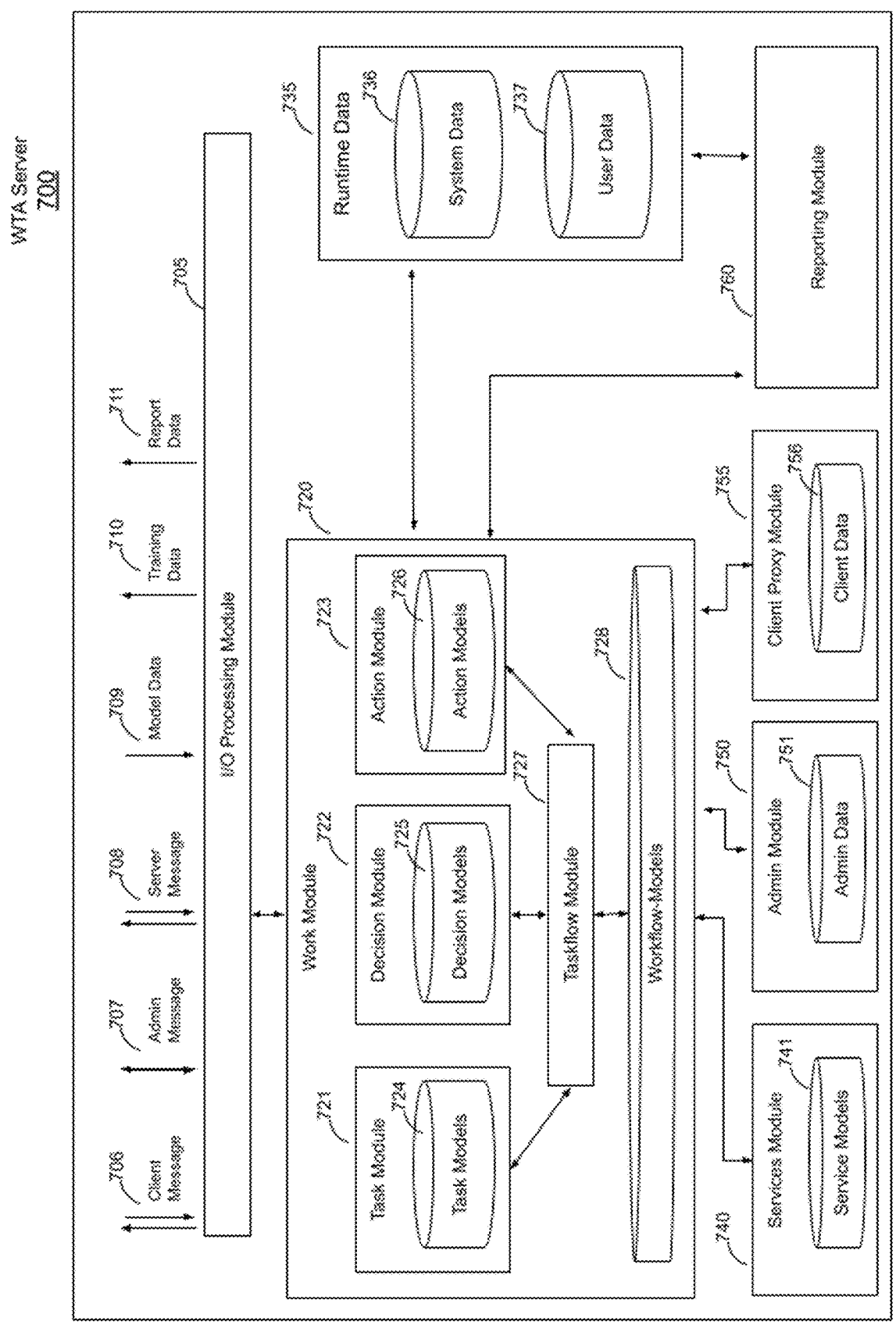
FIG. 7 is a block diagram illustrating the functions of a WTA Server as shown in FIG. 9 according to various examples.

According to some examples, a WTA server may communicate with a WTA client and/or external support services directly through one or more I/O devices 975 in the I/O interface 970. In some examples, WTA server components are designed as illustrated in FIG. 7. When a WTA server is created by a server system, in some embodiments, it creates a work module 720 comprising means for executing a workflow-model. Work module 720, in some embodiments, includes several components used for executing the workflow-model. The task module 721 may be configured for creating and managing one or more runtime instances of task models 724 that represent a task associated with a workflow-model, and managing those tasks during workflow-model execution. Task module 721 can create one or more subtasks associated with one or more tasks it manages. The decision module 722 may be configured for creation and management of runtime instances of decisions based upon the decision model data 725 it owns. Action module 723 may be configured for creating and managing runtime instances of actions using the underlying action-models 726 owns and manages. Taskflow module 727 may be configured for orchestration and execution of the current running tasks, pending tasks, previous decisions, pending decisions, completed decisions, previous actions, current actions, completed actions leveraging task module 721, decision module 722, action module 723 and the workflow-models 728 to accomplish this.

Services module 740 may be configured for managing the API and associated service model 741 data for each respective external support service that WTA server communicates with during runtime execution.

Admin module 750 may be configured for managing the API and associated admin data 751, including authentication data, that is configured for administration of the WTA server through a secure and authenticated channel over the network. This allows an administrator to have visibility and control over the runtime state of the WTA server in real time without the need to pause or stop the service.

Reporting module 760 may be configured for aggregating and managing raw, processed, and/or partially processed data and providing an API for a system or user inside and/or outside of WTA server 700 to collect the data for the purpose of reporting and monitoring of the system. Runtime data 735 is used as the data repository for this purpose, and contains both system data 736 representing data that resides within the domain of a system environment, for example pre-existing training and prediction data, as well as user data 737, for example decision data collected by WTA server from one or more operator devices and/or their operators.

Client proxy module 755 may be configured for interfacing with WTA client API and manages the server-side representation of the operator devices hosting the WTA clients it communicates with.

I/O processing module 705 may be configured for managing the inputs and outputs of the WTA server, examples of which include sending and receiving client messages 706 sent by WTA server to one or more devices over a network for the purpose of prompt the operator to input a decision, admin requests 707 received by WTA server over a network to view or update the state of its configuration, server message 708 for the purpose of WTA server communicating over a network to external support services, model data 709 including current or updated workflow-models for WTA server to execute, training data 710 which includes decision data collected by WTA server from operator devices and their operators for the purpose of learning and improving the workflow-model, and access to report data 711 hosted and/or produced by WTA server for the purpose of assessing the operation and performance of the WTA server and its workflow-model.

Figure 8:
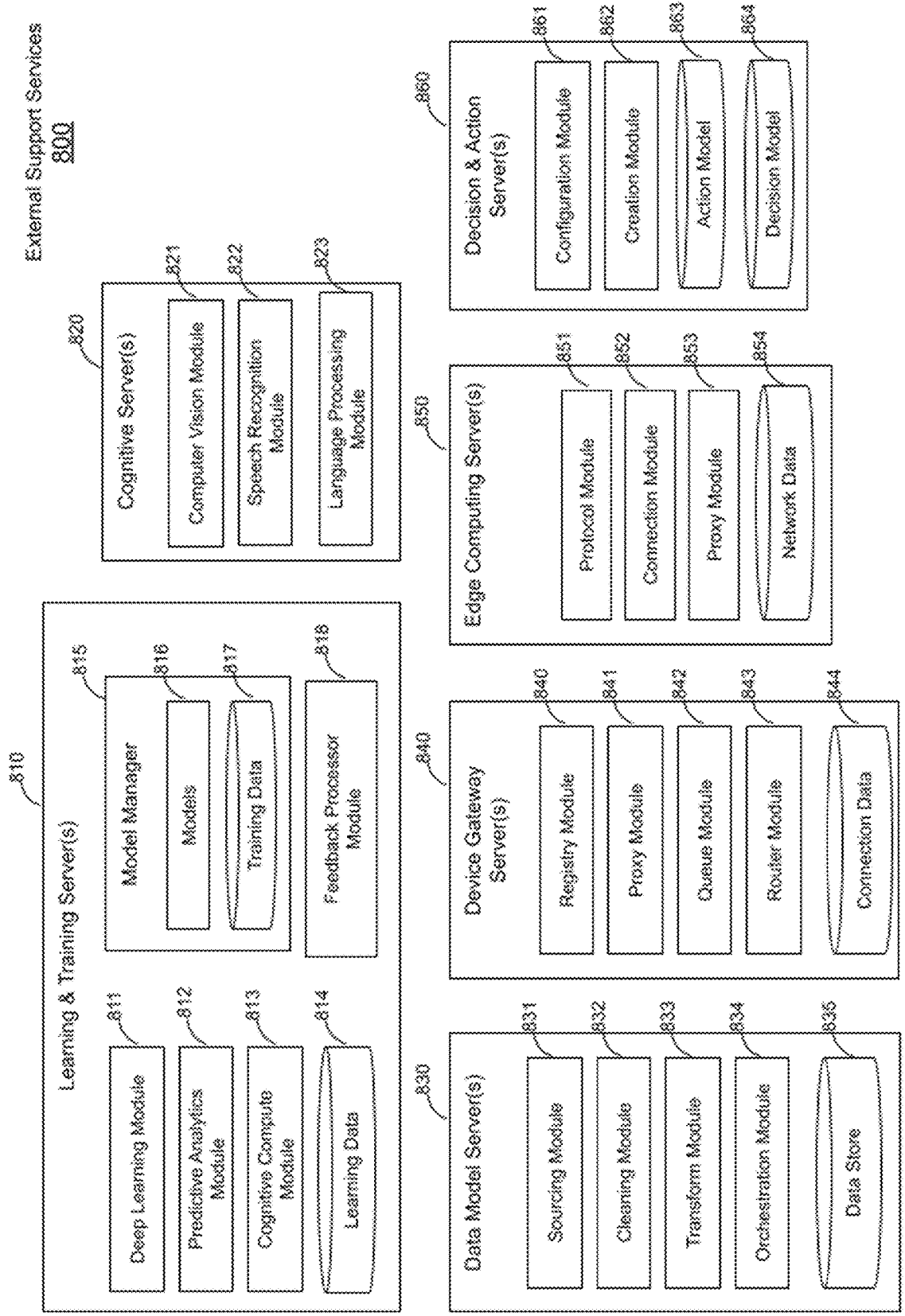
FIG. 8 is a block diagram illustrating examples of the functions of external support services as shown in FIG. 1, in accordance with various examples.

Following creation, in some embodiments, WTA Server 700 establishes connections and registers configurations with external support services including but not limited to the edge computing server, device gateway server, decision & action server, cognitive server, data model server, and learning & training server. WTA server 700, in some embodiments, obtains a workflow-model from a second server, the data model server 830 which is an external support service illustrated in FIG. 8. Work module 720 can, in some embodiments, run one or more machine-learned models, workflow-model(s) 728. WTA server, in some embodiments, can use one or more 3rd party software components to run the workflow-model. Once the workflow-model is running, WTA Server 700 can begin executing tasks.

External support services may be used by the WTA system, according to some examples. The WTA server, in some embodiments, communicates with these external services to support its offline and online operating functions. For example, the WTA server may be able to obtain and update its workflow-model over the network by communicating through a programming interface to the learning and training server 810 over a network. Learning and training server 810, in some embodiments, manages the workflow-model data, specifically creating, updating, and validating machine-learning models. Learning and training server 810, in some embodiments, can use knowledge graphs and/or rule-based algorithms and data together with machine-learning to produce a workflow-model. Learning and training server 810, in some embodiments, contains several modules to support these functions described below: deep learning module 811 may be configured for processing and managing large volumes of data used to generate the workflow-models run by the WTA server and can construct neural network layers and their interconnections for the purpose of inference; predictive analytics module 812 may be configured for processing and managing workflow data to generate tasks and their associated trust-score rating; cognitive compute module 813 may be configured for the generation and composition of decision data models and associated context data models used by the WTA server to collect an operator input decision at runtime; learning data 814 may be configured for storing and accessing the learning data used by the various modules within learning and training server 810; and model manager 815 manages the models 816 and associated training data 817 used to train a workflow-model; feedback processor module 818 may be configured for managing the collection of new and/or updated data from a WTA client and/or other external data sources for the purpose of building and training new workflow-models both offline and online.

Cognitive server 820, in some embodiments, contains computer vision module 821, which may be configured for encoding and decoding images and video, speech recognition module 822 and language processing module 823 which is able to encode and decode natural language inputs and outputs for both the WTA client component and the WTA server component of a WTA system.

Data model server 830 may be configured for providing a workflow-model to a WTA server at runtime. It is comprised of a sourcing module 831 responsible for obtaining a pre-processed workflow-model from learning and training server 810, a cleaning module 832 which standardizes the data into a format compatible for workflow-model execution including elimination of duplicate data, empty data sets and syntactical errors, a transform module 833 that may be configured for performing data transformation operations including string and numeric conversions and input sizing, a orchestration module 834 that may be configured for managing and coordinating the sourcing, cleaning, and transformation operations, and a data store 835 that may be configured for owning and providing access to the data used by the aforementioned operations.

Device gateway server 840 may be configured for managing WTA client connections to WTA server(s). For example, a business entity can have a single organization with two associated domains, a financial services domain, and a strategic planning domain. In furtherance of this example, WTA system has two instances of WTA server associated with the organization, one running a workflow-model representative of the financial services domain, and the other running a second workflow-model representing the strategic planning domain. Accordingly, registry module 840, in some embodiments, owns and manages a map of WTA server connection data and associated domain(s) with a workflow-model representing each domain. Proxy module 841, in some embodiments, manages interfacing with WTA clients and WTA servers within a WTA system over a network and owns the API and associated configuration data for those connections at runtime. Queue module 842, in some embodiments, manages the queuing process for messages sent and received between WTA server and WTA client. Router module 843 may be configured for routing messages to and from WTA client and WTA server using the best available networks, and communicates with edge computing server 850 to accomplish this. Connection data 844, in some embodiments, contains the configuration data and runtime data necessary for device gateway server 840 and the subsystem modules that comprise it to operate as described herein.

Edge computing server 850 may be configured for providing an abstraction layer around edge, cloud and "fog" network nodes that can be implemented using various 3rd party service hosting platforms for the purpose of providing maximum (or increasing) availability of WTA server(s) and external support services within the WTA system. Decision and action server 860 may be configured for creating and managing programming instructions and data for decision and action-models associated with a specific workflow-model run by one or more WTA server(s), providing these models to data model server 830. Configuration module 861 may be configured for the tuning and adjusting of the decision and action-models through parameters coded and/ or learned. Creation module 861 may be configured for creating the models and communicates with the learning and training server to accomplish this. Action model 863 and decision model 864, in some embodiments, are data repositories that own and provide access to the action models and decision models associated with workflow-models 728.

4. Processes for Operating a Workflow Task Agent System

In some examples, FIG. 5 illustrates how a WTA client can interact with a WTA server to display a prompt for decision data from the operator at the device hosting the WTA client. In this example, the WTA server has determined a decision requiring operator input, specifically a determination of whether a payment transaction should be accepted. The WTA server has also determined a device to prompt for the decision, and sent the decision-request object to the device. Once the WTA client receives and decodes the decision-request object from the WTA server, in some embodiments, the operator at the device, in this example a human business agent with expertise in payment risk analysis, can see an initial display on the device screen as shown in 505, containing the natural language prompt for the operator 506, as well as any context data contained in the decision-context object 507 related to the prompt.

In some examples, the decision-context object can be partitioned into multiple displays to case the cognitive load of the operator at the device. In such an example, one or more buttons can be displayed allowing the operator to obtain further details that the system determined were relevant for the operator to make a decision 508. In example illustration 505, the decision-context object contains 3 data context sets, the payer of the pending transaction, the transaction dollar amount, and the location. Each of these data sets, in some embodiments, contain associated details specific to the type of context set, which are made available for the operator to view through with buttons on the display 508. When the operator invokes the detail buttons, in some embodiments, a screen can display further information regarding one or more context sets leveraging one or more modes of media content capabilities of the device, for example text, audio, video.

In some examples, the WTA client can display a binary option for inputting the operator decision, for example "Accept" or "Reject" 509. Once the operator selects one of the binary options, in some embodiments, the WTA client can encode a decision-response object containing the operator decision data and send it back to the WTA server for processing following the aforementioned methods and examples described herein.

In some examples, the WTA client can display a plurality of decision options from which the operator can select to input a decision.

In some examples, the WTA client can display an open-ended question requiring a more verbose natural language input from the operator.

In some examples, the WTA client can provide a "snooze" option along with the decision prompt that allows the operator receiving the prompt to delay provision of a decision to the WTA client. When the operator selects the snooze option, a screen as illustrated in 510 can be displayed. To further this example, the WTA client can present the operator with various per-determined options for how long to snooze the decision as shown in 511.

Figure 11:
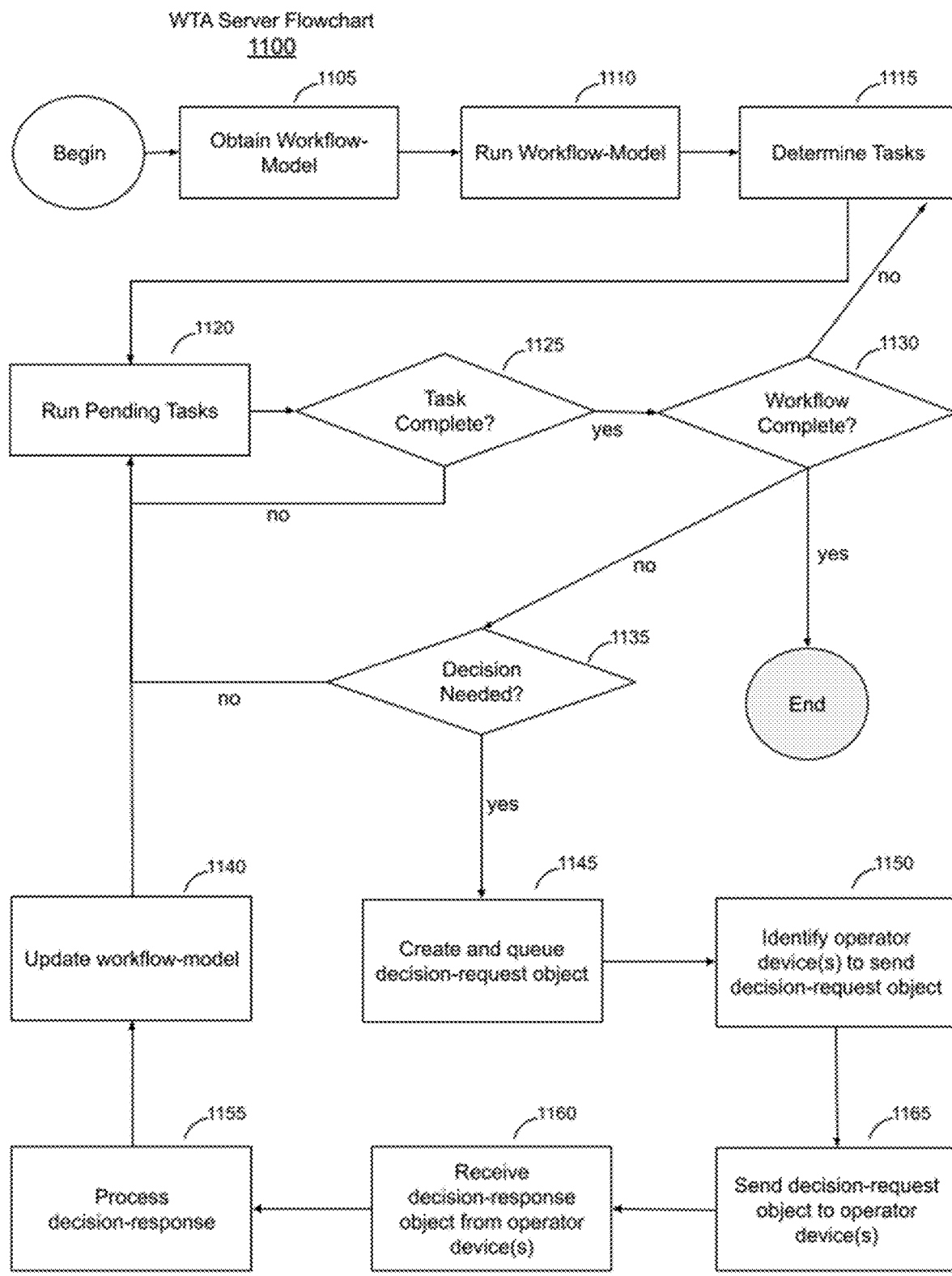
FIG. 11 is a flow diagram illustrating an example WTA server operating process, in accordance with various examples.

FIG. 11 illustrates an example of a flow of operations for a workflow task agent. When a WTA server instance is created, in some embodiments, it runs various initialization and configuration operations which can include connecting and registering to one or more external support services over a network, and obtaining a workflow-model 1105 from one of the external support services, the data model server as shown in FIG. 1 external support services. The WTA server, in some embodiments, runs the workflow-model 1110 in FIG. 11 and begins to determine which tasks need to be run 1115 in order to complete the workflow. After determining the tasks, in some embodiments, the WTA server begins running the tasks 1120, often in parallel leveraging multitasking capabilities of one or more processors. When a task is completed 1125, in some embodiments, a check is done to see if there are any additional tasks to be performed 1130. If there are no remaining tasks to complete, in some embodiments, the WTA server ends execution of workflow-model 1110, after which the flow can be shifted back to the host of the WTA server, as functionally outlined in FIG. 9, at which point the WTA server can reinitialize and/or recreate the WTA server module to run again. If, however, the WTA server module determines there are one or more tasks remaining to be performed and the workflow is not yet complete, in some embodiments, a check is then performed, in some embodiments, to see if the currently executing task requires a decision to progress 1135. If no decision is needed, in some embodiments, task execution continues 1120. If, however, a decision is required to progress execution of the current task, the WTA server module will create and queue a decision-request object 1145, identify which operators and their associated operator devices to send the decision request object 1150, and send the decision-request object to WTA client module on those operator devices 1166. Upon receiving a decision-response object from WTA client on operator device 1160, in some embodiments, the decision-response object is decoded and processed 1155, the client decision data is extracted and sent to the learning and training server for the purpose of updating the workflow-model and the WTA server module returns to executing outstanding tasks for the workflow.

Figure 4:
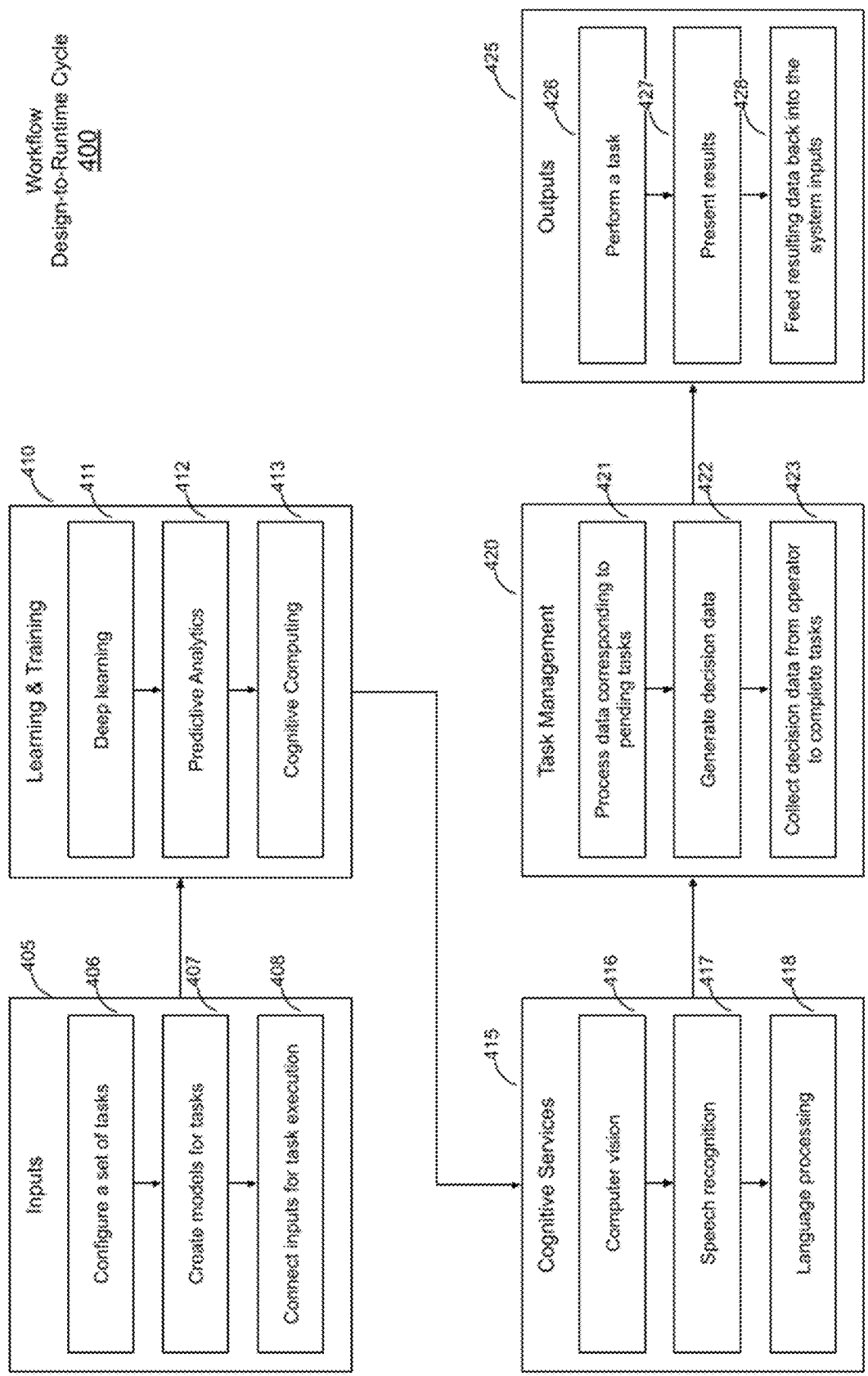
FIG. 4 is a block diagram illustrating an example WTA workflow design-to-runtime cycle, in accordance with various examples.

FIG. 4 illustrates an example of a workflow, specifically the design time to runtime cycle portion thereof. The workflow may be an instance of the workflow-model running in the WTA system. Various datasets relevant to one or more task execution in a given domain, in some embodiments, are collected and used as inputs 405 for the purpose of configuring or more tasks 406 and create models 407 for the workflow. The configuration and connection of inputs 408, in some embodiments, is performed to ensure that the WTA system will have access to resources necessary to perform the tasks within a workflow, and any related action(s). Following the inputs, learning & training 410, in some embodiments, can be performed using the input data and one or more machine learning methods, for example deep learning 411, after which predictive analytics 412 are used from both the inputs 405 and the deep learning 411 to form the tasks. Cognitive computing 413, in some embodiments, is used to correlate and validate the tasks formed in a real-world context, with the goal of reducing hallucinations. Hallucinations as the term is used in the field of artificial intelligence, are machine generated predictions that cannot be grounded in real-world context or data. Following learning and training, cognitive services 415, in some embodiments, can be used by the WTA system when running a task of a workflow as input to generate a prediction, for example, an object can be identified in a video application using computer vision 416 which can generate a WTA system prediction on the intent of the object in the video scene. In furtherance of this example, the WTA system can also detect audible speech in the video application and can process the speech using speech recognition 417 and natural language processing 418 to generate a WTA system prediction. The WTA system, in some embodiments, processes the predictions as part of task management 420, processing the associated data corresponding to pending tasks 421, generating decision data 422, and collecting decision data from an operator at an operator device when necessary to continue or complete the pending task. In the final stage of the example design to runtime cycle of a workflow described herein, the WTA system produces its outputs 425 which can include performing a task, presenting results of the task performed, and feeding back resulting data collected during the cycle into the system inputs 428 at the start of the cycle for the purpose of continued training and improvement of accuracy and efficiency of a workflow.

In some embodiments, Cognitive Computing may be used to enhance the accuracy and reliability of machine learning systems by anchoring their predictions in real-world context. This process is expected to reduce a phenomenon known as "hallucinations", when a machine learning model makes incorrect or overly confident predictions that do not align with reality.

In some machine learning workflows, models are trained on large datasets and then used to make predictions or perform tasks. However, these models can sometimes generate results that are logically inconsistent or contextually irrelevant. Cognitive Computing, in some use cases, addresses this by introducing a post-prediction validation layer that correlates the model's output with real-world data, ensuring that the tasks are contextually accurate and practically viable.

In some examples, Cognitive Computing is applied as follows:

Task Generation: The system starts by generating tasks or predictions using a pre-trained machine learning model. For example, in a video analysis application, the model might detect actions like "person running" or "person walking."

A machine learning model generates a prediction or task $T_i$ based on input data.

Contextual Validation: Cognitive Computing then cross-references these tasks against real-world context—such as the time of day, weather conditions, or location. If the model predicts "person running" during a heavy rainstorm, the system flags this as a low-confidence prediction because running in the rain might be less likely.

Cognitive Computing, in some embodiments, calculates a validation score $V(T_i)$ by correlating $T_i$ with real-world context data $C_j$.

$$V(T_i) = \sum_{j=1}^{n} w_j \times f(T_i, C_j)$$

where:
a. $V(T_i)$ is the validation score for the task $T_i$, representing the confidence level that the prediction is correct within the given context.
b. $w_j$ is the weight representing the importance of each context parameter $C_j$.
c. $f(T_i, C_j)$ is a function that measures the consistency or relevance of task $T_i$ with the context $C_j$.
d. $C_j$ is the real-world context data, such as patient transaction history or geographical location. In some examples, context data could include the patient's payment history, transaction amount relative to typical payments, and the geographical location of the transaction. For instance, $C_1$="Patient's previous transactions are legitimate" and $C_2$="Transaction amount is unusually high for this patient". For example, If $T_i$ flags the transaction as fraudulent, but $C_1$ indicates a history of legitimate transactions, the validation score $V(T_i)$ may be low.

Correlation and Adjustment: The system, in some embodiments, also checks if the sequence of tasks makes logical sense. If the model suggests that someone starts running before walking, Cognitive Computing corrects this to align with typical human behavior. A correlation score $S(T_i, T_{i-1})$ may increase the likelihood that the sequence of tasks aligns with logical patterns.

$$S(T_i, T_{i-1}) = g(T_i, T_{i-1})$$

where:
a. $S(T_i, T_{i-1})$ is the correlation score between task $T_i$ and the previous task $T_{i-1}$, indicating how logically consistent the sequence is.
b. $g(T_i, T_{i-1})$ is a function that checks the logical consistency between the tasks $T_i$ and $T_{i-1}$.

For example, if the previous transaction $T_{i-1}$="Transaction Y is legitimate" and it involved a similar transaction amount and the same location, the system might adjust $T_i$ based on $S(T_i, T_{i-1})$.

Feedback Integration: As the system operates, in some embodiments, it continuously (e.g., with each new instance of feedback, or periodically, like daily or weekly) learns from the real-world outcomes, refining its validation criteria to improve accuracy over time, e.g., adjusting model weights and biases in response.

The system updates validation criteria wjw_jwj and correlation logic $g(T_i, T_{i-1})$ based on outcomes $O(T_i)$.

$$w_j^{new} = w_j + \alpha \times (O(T_i) - V(T_i))$$

where:
a. $w_j^{new}$ is the updated weight for context parameter $C_j$.
b. $\alpha$: is the learning rate, controlling how much the weights are adjusted based on new information.
c. $O(T_i)$ is the actual outcome of the task $T_i$, indicating whether the initial prediction was correct.
d. $V(T_i)$ is the original validation score for task $T_i$.

For example, if a flagged fraudulent transaction is later found to be legitimate, $w_j$ for the patient's payment history $C_1$ might be increased.

An example use case follows. The system, in some embodiments, rigorously monitors and detects fraudulent patient payment transactions with precision. When a machine learning model flags a particular transaction $T_1$ as fraudulent, Cognitive Computing, in some embodiments, validates this prediction through a comprehensive, context-driven approach:

Contextual Validation:
The system, in some embodiments, immediately (e.g., within less than 500 ms, less than 1 minute, or within less than 10 minutes) analyzes contextual data, where:
a. $C_1$ is whether the patient has a well-documented history of legitimate transactions, providing a strong indicator of reliability.
b. $C_2$ is a transaction amount is significantly higher than the patient's typical payments, raising a potential concern.

Cognitive Computing, in some embodiments, recognizes that $C_1$ strongly supports the legitimacy of the transaction. As a result, in some embodiments, the validation score $V(T_1)$ is adjusted to reflect a reduced confidence in the initial fraud prediction.

Correlation Check:
The system, in some embodiments, thoroughly examines the logical sequence of events:
a. The previous transaction $T_{i-1}$ was legitimate, involving a similar amount and originating from the same location.
b. Cognitive Computing identifies a strong correlation $S(T_1, T_{i-1})$ between these transactions, further decreasing the likelihood that $T_1$ is fraudulent. This correlation confirms, in some embodiments, the consistency and legitimacy of the transaction sequence.

Adjustment:
Based on high validation and correlation scores, in some embodiments, Cognitive Computing confidently adjusts the fraud prediction. The system, in some embodiments, lowers the risk score for $T_1$ and marks it for additional review, ensuring that legitimate transactions are not wrongly flagged while maintaining vigilant fraud detection.

By validating tasks against real-world context, in some embodiments, Cognitive Computing is expected to significantly reduce the likelihood of incorrect predictions, making machine learning models more reliable and applicable to real-world scenarios. In the healthcare payment fraud example, by validating predictions against real-world context. That said, embodiments are not limited to systems implementing this technique, which is not to suggest that any other feature described herein is required in all embodiments.

Cognitive Computing, in some embodiments, can help a system to operate with enhanced accuracy and contextual intelligence. By validating and adjusting predictions based on real-world context, it may effectively minimize (or reduce the incidence of) false positives, protect legitimate transactions, and strengthen the system's ability to accurately detect and respond to genuine fraud.

This method, in some embodiments, is expected to have additional profound implications for fields including but not limited to autonomous vehicles, healthcare diagnostics, and any application where accurate, context-aware decision-making is critical.

Cognitive Computing, in some embodiments, can help with a shift from purely data-driven models to contextually intelligent systems. By anchoring machine learning predictions in the reality of the physical world, in some embodiments, the system can function effectively in dynamic open-system environments.

In some examples, a workflow task can include one or more subtasks for the purpose of implementing smaller units of work, each of which are themselves tasks. Such a composition can provide value by facilitating flexibility in how tasks are modeled toward real-world tasks, and allow for easier inspection and monitoring during runtime execution.

In some examples, the WTA server can use a trust-score algorithm to determine if and when an operator decision is needed while running a task. The trust-score can be implemented using any suitable algorithm or combination of algorithms capable of producing a scalar value, the "trust-score," using the prediction of a machine-learned model, and determining whether the value produced exceeds a threshold value that is configurable and comparable to the value produced. Additionally, the WTA server, in some embodiments, is capable of generating context meta-data associated with trust-score, specifically a human-readable analysis of data inputs (features) which contributed to the score and which data inputs would lead to improving the trust-score. In this example, the algorithm can be implemented as follows:

```
BEGIN
# Step 1: Data Input
INPUT transaction_details, user_behavior, historical_patterns
# Step 2: Feature Extraction using Deep Learning Models
# Extract features from transaction details using a Transformer
f_td = Transformer(transaction_details)
```

In some embodiments, transformer architectures may involve a multi-layer stack of self-attention mechanisms and feedforward neural networks, designed to process sequences of data, such as text, by modeling relationships between elements in the sequence regardless of their distance from each other. A transformer model may be an encoder-decoder structure, where the encoder processes the input sequence and the decoder generates the output sequence, each consisting of multiple layers. Each layer in both the encoder and decoder may include a multi-head self-attention mechanism followed by a position-wise fully connected feedforward network. Or some embodiments may use a decoder-only or encoder-only model.

The self-attention mechanism in some embodiments may compute a weighted sum of the input elements, where the weights are determined by the attention scores. These scores may be derived by comparing a query with a set of keys, both of which are linear transformations of the input sequence, and then normalizing the result using a softmax function. Each head in the multi-head attention mechanism may perform this operation independently, allowing the model to focus on different parts of the sequence simultaneously, and the results from all heads may be concatenated and linearly transformed to produce the final output of the attention layer.

In some embodiments, positional encoding may be added to the input sequence to incorporate the order of elements, since the self-attention mechanism alone does not account for the positions. The positional encoding may involve sine and cosine functions of different frequencies, which may be added to the input embeddings, allowing the model to learn relative positions of elements in the sequence.

The feedforward neural network in some embodiments may consist of two linear transformations with a ReLU (Rectified Linear Unit) activation function in between. This network may be applied independently to each position in the sequence, providing the model with the ability to apply non-linear transformations to the features extracted by the self-attention mechanism.

In some embodiments, transformer architectures may also include mechanisms for regularization, such as dropout, which randomly sets a fraction of the input units to zero during training, and layer normalization, which normalizes the inputs across the features. These mechanisms may help in preventing overfitting and ensuring stable training of the model.

```
# Extract features from user behavior using an RNN
f_ub = RNN(user_behavior)
```

In some embodiments, the Recurrent Neural Network (RNN) may be a type of neural network architecture designed to process sequences of data by maintaining a hidden state that captures information about previous elements in the sequence. Unlike feedforward neural networks, RNNs may allow information to persist across time steps, making them particularly suitable for tasks involving sequential data, such as time series forecasting, natural language processing, and speech recognition.

At each time step, an RNN may take an input vector and combine it with the hidden state from the previous time step to produce a new hidden state. The hidden state may be a fixed-size vector that represents the memory of the network, effectively summarizing the relevant information from all preceding time steps. Mathematically, the hidden state at a time step may be computed by applying a non-linear activation function, such as the hyperbolic tangent function (tanh) or Rectified Linear Unit (ReLU), to a weighted sum of the input at the time step and the hidden state from the previous time step.

The output of the RNN at each time step may be generated by applying a linear transformation to the hidden state, optionally followed by a softmax function if the task involves classification. This may allow the RNN to produce predictions for each element in the sequence, with the hidden state providing contextual information from previous time steps.

In some embodiments, the hidden state may be initialized to a vector of zeros at the beginning of processing a sequence. However, in more complex architectures, the hidden state may be initialized using learned parameters or the final hidden state from another sequence.

```
#Extract features from historical patterns using a CNN
f_hp=CNN(historical_patterns)
```

In some embodiments, the Convolutional Neural Network (CNN) may be a type of deep learning model configured for processing data with a grid-like topology or in a sequence. CNNs may leverage the spatial hierarchies in data through a series of convolutional and pooling layers that progressively extract higher-level features from the input.

A CNN may begin with a convolutional layer, where a set of learnable filters, also known as kernels, is applied to the input data. Each filter may slide across the input matrix, performing a convolution operation by calculating the dot product between the filter values and the input values covered by the filter at each position. This operation generates a feature map, which highlights the presence of certain patterns, such as edges, textures, or shapes, in specific regions of the input. The filter weights may be shared across the entire input, allowing the CNN to detect the same feature regardless of its location within the input data.

In some embodiments, the convolutional layer may be followed by a non-linear activation function, such as ReLU (Rectified Linear Unit), which introduces non-linearity into the model, enabling it to learn more complex representations. The ReLU function may replace all negative values in the feature map with zero, helping the model to focus on positive activations that indicate the presence of the learned features.

Subsequent to the convolutional layer, a pooling layer may be used to reduce the spatial dimensions of the feature maps, which helps in reducing the computational load and controlling overfitting by providing a form of translation invariance. In some embodiments, max pooling may be employed, where the maximum value within a specified window is selected, effectively downsampling the feature map. Alternatively, average pooling may be used, where the average value within the window is computed. Pooling operations may be applied independently to each feature map, preserving the most important information while reducing the dimensionality.

A CNN may include multiple convolutional and pooling layers stacked on top of each other (e.g., with outputs on one take as inputs to the next), allowing the network to learn increasingly abstract and complex features as the input data passes through the layers. Early layers may detect simple patterns, while deeper layers may recognize more complex patterns.

In some embodiments, after the series of convolutional and pooling layers, the CNN may include one or more fully connected layers. These layers may take the flattened output from the final pooling layer and process it as a (e.g., non CNN) neural network, with each neuron connected to every neuron in the previous layer. The fully connected layers may aggregate the features learned by the convolutional layers to make the final predictions, such as classifying an input into one of several categories.

The CNN may also incorporate techniques like batch normalization, which normalizes the output of a layer by subtracting the batch mean and dividing by the batch standard deviation, and dropout, which randomly drops a fraction of the connections during training to prevent overfitting.

```
# Step 3: Calculate Uncertainties for Each Modality
u_td = CalculateUncertainty(Transformer, transaction_details)
u_ub = CalculateUncertainty(RNN, user_behavior)
u_hp = CalculateUncertainty(CNN, historical_patterns)
# Step 4: Combine Feature Vectors into a Joint Feature Representation
f_joint = CONCATENATE(f_td, f_ub, f_hp)
# Step 5: Combine Uncertainties using Bayesian Fusion
u_joint = 1 / (1/U_td + 1/U_ub + 1/U_hp)
```

In some embodiments, Bayesian Fusion may be used to combine these multiple sources of information or data, each with its own uncertainty, to produce a single, more accurate estimate of a variable of interest. This process may be grounded in Bayesian probability theory, where each source of information is treated as a probabilistic model providing a likelihood function, and the fusion process updates the belief about the variable in question by combining these likelihoods.

Bayesian Fusion may begin with an initial belief or prior distribution about the variable of interest. This prior distribution may reflect any existing knowledge or assumptions before any new data is considered. As new data or evidence from different sources becomes available, Bayesian Fusion may update this belief to form a posterior distribution, which represents the updated knowledge after taking the new data into account.

In some embodiments, the fusion process involves calculating the posterior distribution using Bayes' theorem, which combines the prior distribution with the likelihood functions provided by each data source. If the data sources are independent, the likelihood functions from different sources may be multiplied together, and this product is then multiplied by the prior distribution. The result is, in some embodiments, then normalized to ensure it forms a valid probability distribution.

In some embodiments, Bayesian Fusion may be applied iteratively, where the posterior distribution obtained after fusing one data source becomes the prior distribution for the next fusion step with another data source. This approach may allow for sequential updating of beliefs as new data becomes available over time.

The result of Bayesian Fusion is a posterior distribution that reflects a more informed estimate of the variable of interest, taking into account all available data sources and their associated uncertainties. The fused estimate may have a lower uncertainty compared to estimates derived from individual sources, as the fusion process integrates multiple independent pieces of evidence.

Step 6: Prediction using Machine Learning Models

Some embodiments predict a result of completing the task at hand. In an example workflow, the AI agents may extract features from data related to a task, e.g., payment transaction data, user behavior data in the software platform that has integrated payment processing, and historical data of the user, merchant etc. using, for instance, an RNN or a CNN. The uncertainties for each modality may be combined, and machine learning models like those discussed below may be used for predicting a result of the task, e.g., whether a transaction is fraudulent. Example approaches include using two different methods, XGboost and LSTM, and then combined using Baysian fusion to produce a final prediction, e.g., of whether the payment transaction was fraudulent.

```
# Use XGBoost for regression analysis
y_r = XGBoost(f_joint)
```

In some embodiments, XGBoost (Extreme Gradient Boosting) may be a gradient boosting framework designed for relatively high-performance implementation of tree-based machine learning algorithms. XGBoost may operate by building an ensemble of decision trees in a sequential manner, where each new tree is trained to correct the errors of the previous trees.

XGBoost, in some embodiments, starts with an initial prediction, e.g., an average of the target values in the case of regression or a uniform probability distribution in classification. The model may then iteratively add decision trees to the ensemble. Each tree may be trained on the residual errors (the difference between the predicted values and the actual values) from the previous iteration. The objective function may be configured to minimize the residuals by adding trees that focus on correcting the mistakes made by the earlier models.

In some embodiments, the trees in XGBoost are constructed using a greedy optimization algorithm, which selects the best split at each node of the tree by minimizing a loss function (e.g., Gini impurity or entropy). The loss function may include both the residuals (to measure how well the model fits the data) and a regularization term (to penalize the complexity of the model, thereby preventing overfitting). This regularization term may include both the L1 (Lasso) and L2 (Ridge) penalties, which may help control the size of the weights and the number of leaves in the trees.

Steps in each iteration of XGBoost may include the following:

For each training example, the gradient (first derivative) and Hessian (second derivative) of the loss function with respect to the predictions may be computed. The gradient indicates the direction in which the model's predictions need to be adjusted to reduce the error, while the Hessian provides information about the curvature of the loss function, which can be used to adjust the step size.

A decision tree may be built by splitting the data at each node based on the gradients and Hessians. The splits may be chosen to minimize the loss function, taking into account both the reduction in error and the regularization penalties.

The process continues until a stopping criterion is met, such as a maximum tree depth or a minimum number of samples in a leaf.

After a tree is added to the model, its contribution may be scaled by a learning rate parameter. This shrinkage process prevents the model from making too large updates in a single step, promoting a more gradual improvement and reducing the risk of overfitting.

XGBoost may prune trees after they are built by removing nodes that do not contribute significantly to reducing the loss. This may be controlled by a parameter called "gamma," which sets a threshold for the minimum improvement required to keep a split. Additionally, the regularization terms in the loss function may help ensure that the model remains generalized and avoids overfitting by penalizing complex models.

The predictions may be updated by adding the outputs of the new tree to the predictions from all previous trees. This updated prediction may then be used to compute the residuals for the next iteration.

This iterative process may continue until a specified number of trees are built or until no further improvement in the loss function is detected.

```
# Use LSTM for sequential analysis
y_s = LSTM(f_joint)
```

In some embodiments, the Long Short-Term Memory (LSTM) network may be a type of Recurrent Neural Network (RNN) designed to manage long-term dependencies in sequential data. LSTMs may mitigate the issues of vanishing and exploding gradients that can occur in standard RNNs by incorporating memory cells and a set of gating mechanisms that control the flow of information within the network, allowing the model to retain and update its memory over time.

An LSTM network may process input sequences step by step, with each LSTM unit handling one time step. Each unit may contain a memory cell responsible for storing information across time steps, as well as three main gates: the forget gate, the input gate, and the output gate. These gates may work together to manage what information is kept, updated, or discarded from the memory cell.

The forget gate may determine how much of the previous memory should be retained. It may do this by evaluating the previous hidden state and the current input, deciding which parts of the existing memory to forget and which to keep. The input gate, on the other hand, may control how much new information from the current input and the previous hidden state should be added to the memory. This may involve generating candidate values that could be added to the memory, and then deciding, based on the input, which of these values to store.

The memory cell may be updated by combining the old memory (adjusted by the forget gate) with the new information (adjusted by the input gate). This updated memory may reflect both the retained information from previous time steps and the newly added information.

Finally, the output gate may determine which part of the updated memory should be passed on to the next time step and used in the current output. The output may be influenced by both the current input and the previous hidden state and reflects the relevant aspects of the memory cell's content.

The hidden state, which is influenced by the output gate, may be then passed to the next LSTM unit, allowing the network to maintain a dynamic, context-sensitive memory that is updated as the sequence progresses. This mechanism may allow the LSTMs to effectively capture long-term dependencies, making them suitable for tasks involving sequential data, such as natural language processing, time series prediction, and speech recognition. LSTM networks may be stacked into multiple layers to handle more complex patterns, and may be combined with other neural network components, like convolutional layers or attention mechanisms, to enhance their performance in some use cases.

```
# Step 7: Bayesian Model Averaging for Final Prediction
y_final = (y_r / u_td + y_s / u_ub) / (1/u_td + 1/u_ub)
# Step 8: Calculate Trust Score
trust_score = 1 / u_joint
# Step 9: Feature Importance Analysis using SHAP values
SHAP_values = CalculateSHAP(f_joint)
``` where:
a. y_r is the prediction (risk score) from the XGBoost regression model, based on the combined feature vector f_joint.
b. y_s is the prediction (risk score) from the LSTM sequential model, based on f_joint.
C. u_tc, u_ub, u_hp are uncertainties from the Transformer (transaction details), RNN (user behavior), and CNN (historical patterns) models, respectively (as discussed in step 3 above).
d. y_final is the final risk score, computed by combining y_r and y_s using Bayesian averaging, weighted by their respective uncertainties.
e. u_joint is the combined uncertainty of all modalities (transaction details, user behavior, historical patterns), calculated using Bayesian fusion (as discussed in step 5 above).
f. trust_score is the system's confidence in the final prediction, calculated as the inverse of the joint uncertainty 1/u_joint. A lower uncertainty results in a higher trust score.
g. SHAP_values represent the contribution of each feature in the joint feature vector f_joint to the final risk prediction. SHAP values explain which features (transaction details, user behavior, historical patterns) most influence the model's prediction.

In some embodiments, the SHAP (SHapley Additive explanations) values are calculated to explain the output of a machine learning model by attributing the prediction to each input feature. The calculation of SHAP values may be based on concepts from cooperative game theory, particularly the Shapley value, which fairly distributes the total gain (or prediction) among all contributors (or features), or other measures of network centrality may be used.

In some embodiments, the SHAP value for a feature represents its contribution to the difference between the actual model prediction and the average prediction across all data points, considering all possible combinations of feature inclusion or exclusion.

The process for calculating SHAP values may involve the following steps:
a. The prediction for a specific instance is viewed as the outcome of a game where different combinations of features contribute to the final output. The model's output when all features are present is compared to the output when one or more features are excluded.
b. For each possible combination of features, the marginal contribution of a feature is calculated by measuring the difference in the model's prediction with and without that feature included. This requires computing the model's prediction for all possible subsets of features with and without the specific feature in question.
  c. SHAP values may be computed by averaging the marginal contributions of a feature over all possible combinations of other features. Mathematically, this may be done by considering every possible ordering of features and computing the difference in the prediction that the feature makes when it joins a set of preceding features versus when it is excluded. The SHAP value may be the weighted average of these differences.

Since the exact calculation of SHAP values often involves evaluating the model on every possible combination of feature subsets, it can be computationally expensive, especially with a large number of features. In some embodiments, various approximations and methods, such as Kernel SHAP or Tree SHAP, may be used to efficiently compute SHAP values without needing to exhaustively evaluate every subset.

In Kernel SHAP, a model-agnostic approach that approximates SHAP values using a weighted linear regression may be used, where the model's predictions are approximated based on randomly sampled subsets of features.

In Tree SHAP, an efficient algorithm specifically designed for tree-based models, such as random forests or gradient-boosted trees, may be used. It may leverage the structure of decision trees to calculate SHAP values in polynomial time, significantly reducing computational cost.

Once calculated, SHAP values may provide insight into the importance and impact of each feature on the model's prediction. A positive SHAP value may indicate that the feature contributes positively to the prediction (increasing the predicted value), while a negative SHAP value may indicate a negative contribution (decreasing the predicted value). The magnitude of the SHAP value may reflect the strength of the feature's contribution. In some cases, the values may be ranked, and thresholded, e.g., to select only those above or below a threshold rank or score, and results may be presented or stored in memory.

ments, can produce a decision output, which may be called a "prediction" in the field of intelligent agents, for the purpose of determining whether an online payment transaction is valid and should be performed or instead, is fraudulent and should not be performed. The ability to generate a trust-score may allow the WTA server to determine whether it should defer its decision to a human-agent of the business entity skilled in the field of payment risk. The benefit of this process, in some embodiments, is that it creates a balance in the necessary tradeoff between the speed and accuracy gained through intelligent agent decision-making, and enables human-agents of the business with skilled in the field to gain a level of trust in using the machine agents, enabling more business tasks to be performed at a higher confidence level, with less time and effort for the business and its agents.

In some examples, WTA system uses a human assisted active machine learning method (HAAML) to determine when a human-agent decision would be accretive to completion of a task and/or subtask in a workflow-model: Some embodiments create a system where AI agents not only request human intervention when necessary but also actively select the most informative samples for further training. This hybrid approach may maximize (or increase) learning efficiency, minimize (or reduce) data requirements, and optimize (or improve) resource use.

Workflow Space(S): Let S be the set of all possible states within workflow-model tasks and subtasks, $x \in S$ in representing the environment features the intelligent agent encounters.

Action Space (A): The set A represents all possible actions within workflow-model task and/or subtask, the intelligent agent can take in any state (the action-model).

Reward Function (R): The reward function R (s, α) provides feedback on the action taken in state s, guiding the intelligent agent towards maximizing the cumulative reward.

```
# Step 10: Identify Data Gaps and Improvement Opportunities. Pseudocode for the
same may include the following.
  IF High_Uncertainty_Modality IS transaction_details THEN
     meta_data += Suggest("Collect more detailed transaction attributes or metadata")
  ENDIF
  IF High_Uncertainty_Modality IS user_behavior THEN
     meta-data += Suggest("Collect more comprehensive user behavior data")
  ENDIF
  IF High_Uncertainty_Modality IS historical_patterns THEN
     meta-data += Suggest("Collect more historical transaction data")
  ENDIF
  # Step 11: Output Final Prediction and Trust Score
  OUTPUT y_final, trust_score, meta_data
  END
```

The purpose of such a "trust-score" function, in some embodiments, is to allow the WTA server to quantitatively assess its own confidence in its decision-making abilities for a task associated with a workflow-model prior to running the task. The term "trust" does not refer to, or require, a subjective assessment of trust by a human. Rather, the term "trust" is a label applied to a computed value that approximates trustworthiness in the relevant domain. For example, if a business entity is running a WTA system with a workflow-model related to a financial services domain, specifically online payment transactions, the WTA server can determine whether a pending online payment transaction should be performed. The WTA server, in some embodi- Active Learning:

Uncertainty Quantification: For each state-action pair (s, α), the intelligent agent, in some embodiments, estimates the uncertainty in its decision. This is represented by the posterior distribution $\pi(\alpha|s) \sim N(\mu\pi, \sigma2/\pi)$ is the uncertainty.

Sample Selection Strategy: The intelligent agent, in some embodiments, actively selects the most uncertain states s for additional training. This is achieved by computing an uncertainty score $U(s) = \max_\alpha \sigma\pi(\alpha|s)$ and choosing states with the highest U(s) for human-agent decisioning or further exploration.

Delegation of Decision to an Expert Human:

Human Decision Trigger: The intelligent agent, in some embodiments, sends a decision-request when the uncertainty or σπ(α|s) exceeds a predefined threshold $\theta_u$. This allows the WTA system to leverage human-agent expertise selectively.

Reward Shaping with Human Decision: When the human-agent provides decision-data, in some embodiments, it is used to update both the workflow-model π(α|s) and the reward function R(s, α), creating a more accurate and human-aligned reward signal. The update rule can be expressed as:

$$R'(s, a) = (1 - \lambda_h)R(s, a) + \lambda_h H(s, a)$$

where H (s, α) is the human-agent decision-response that includes decision-data, and $\lambda_h$ is the weighting factor balancing human-agent and intelligent agent-derived rewards.

Human Feedback Integration with Expertise Weighting: Some embodiments then swap the fixed weighting factor $\lambda_h$ representing human-agent decision data to a dynamic weighting based on the expertise level E of the human providing feedback. The updated workflow-model policy π' is given by:

$$\pi'(a \mid s) = (1 - \lambda_h(E)) \cdot \pi(a \mid s) + \lambda_h(E) \cdot H(s, a)$$

where the expertise-weighted feedback factor $\lambda_h(E)$ is computed as:

$$\lambda_h(E) = \frac{1}{1 + e^{\gamma(E - E_0)}}$$

Here, E represents the expertise level of the human-agent, $E_0$ is the baseline expertise level, and γ controls how sharply the weighting adjusts based on the expertise level. This formula, in some embodiments, ensures that feedback from more knowledgeable humans has a greater influence on the intelligent agent's learning process.

Combined Learning Process:

Exploration-Exploitation Balance: The hybrid system, in some embodiments, uses Thompson Sampling for exploration and the active learning strategy to focus on uncertain states. The exploration-exploitation trade-off, in some embodiments, is managed by balancing the intelligent agent's internal uncertainty with the selection of informative samples for training.

In some embodiments, Thompson Sampling may be employed to address decision-making problems where the WTA system must select from multiple actions while aiming to maximize a cumulative reward. Thompson Sampling may be particularly relevant in scenarios involving "multi-armed bandit" problems, where there are a set of arms, each corresponding to a different action or choice, and the reward for each action is unknown but can be estimated based on observations. Each arm may be associated with an unknown probability distribution of rewards, and the goal in some embodiments may be to select actions to balance exploration (gathering more information about each arm) and exploitation (choosing arms that are expected to provide the highest reward).

Some embodiments may maintain a probability distribution over the expected reward of each arm. Initially, the distributions may be non-informative or assigned prior distributions, such as a uniform distribution or beta distributions for binary outcomes. For each iteration or trial, a reward sample may be drawn from each of these probability distributions. Some embodiments may then select the arm corresponding to the highest sampled reward value for that iteration. This sampling step ensures that different arms may be selected, even if one arm currently appears optimal, allowing for a degree of exploration.

After selecting an arm and observing the actual reward, the probability distribution associated with that arm may be updated to reflect the observed data. In some embodiments, this updating process may be performed using Bayesian updating principles. For example, in cases where the rewards are binary (e.g., success/failure), a beta distribution may be used as the posterior distribution, which may be updated based on the observed successes and failures. The parameters of the beta distribution (α and β) may be incremented by one for each observed success and failure, respectively. This process results in progressively refining the model's understanding of the reward distribution associated with each arm.

In embodiments involving non-binary rewards, a Gaussian distribution may be used, where the mean and variance of the distribution are updated based on observed rewards. In these cases, after each iteration, the algorithm may adjust the estimated mean and variance of the reward distribution for the selected arm using techniques such as Bayesian inference, where the observed reward acts as evidence to refine the posterior distribution.

Human-Guided Exploration: Human decisioning data, in some embodiments, is integrated not only when uncertainty is high (e.g., determined to be above a threshold) but also during exploration phases where human-agent input can provide critical insights, especially in complex or edge-case scenarios.

Mathematical Formulation:

Bayesian Update for Workflow-Model:

The intelligent agent, in some embodiments, maintains a Bayesian posterior distribution over its workflow-model policy:

$$\pi(a \mid s) \sim N\left(\mu_\pi, \sigma\frac{2}{\pi}\right)$$

where:
a. π(α|s) is the probability of taking action α in state s.
b. μπ is the mean, representing the most likely action.
c. σ 2/π is the variance, representing the uncertainty in action selection.
d. N(μπ, σ 2/π) is a normal (Gaussian) distribution of the mean (likely action) and variance (uncertainty).

When new data (either from human feedback as decision data or active learning) is incorporated, the posterior, in some embodiments, is updated using Bayes' theorem:

$$\pi'(a \mid s) = \frac{P(D \mid \pi(a \mid s)) \cdot \pi(a \mid s)}{P(D)}$$

where D represents the new data (human decision data or newly selected samples).

Active Learning Selection Criterion:

The agent, in some embodiments, selects states s for further learning based on:

$$s^* = \arg\max_s U(s)$$

where:
- a. s* is the state where the AI agent identifies the highest uncertainty and decides it needs to request human decision-data to make a decision.
- b. arg max, is the operation that finds the state s with the maximum uncertainty score U(s), meaning it's the state where the AI agent is most unsure about which action to take.
- c. $U(s) = \max_\alpha \sigma_\pi(\alpha|s)$ is the uncertainty score for state s. It's calculated as the maximum uncertainty on $(\alpha|s)$ across all possible actions $\alpha$ in that state, where $\sigma_\pi(\alpha|s)$ is the uncertainty in choosing action $\alpha$ given state s.

The agent, in some embodiments, actively queries human decision data for these states or focuses additional computational resources on them.

Workflow-Model Update with Human Decisioning:

The updated workflow-model, in some embodiments, after incorporating human decision data feedback is:

$$\pi'(a|s) = \frac{(1-\lambda_h(E))\cdot\pi(a|s) + \lambda_h(E)\cdot H(s,a)}{(1-\lambda_h(E)) + \lambda_h(E)}$$

where:
- a. $\pi'(\alpha|s)$ is the updated policy after incorporating human feedback, which, in some embodiments, represents the new probability of taking action $\alpha$ in state s after the policy has been adjusted with human decision-data input.
- b. $\pi(\alpha|s)$ is the original policy before incorporating human feedback, which, in some embodiments, represents the current probability of taking action $\alpha$ in state s based on the AI agent's learned model.
- c. $\lambda_h(E)$ is the weighting factor based on the human's expertise E, which, in some embodiments, balances the influence of the AI agent's original policy and the human feedback in the policy update. Higher expertise E leads to a higher $\lambda_h(E)$, giving more weight to the human's decision-data input.
- d. H (s, $\alpha$) is the feedback provided by the human for action aaa in state s representing the human's decision-data input, which, in some embodiments, may include a suggestion on what action $\alpha$ should be taken in state s.
- e. $(1-\lambda_h(E))\cdot\pi(\alpha|s)$ is the contribution of the original policy to the updated policy, which, in some embodiments, ensures that the AI agent's learned policy still influences the final decision, weighted by how much trust is placed in the agent relative to the human expert.
- f. $\lambda_h(E)\cdot H(s,\alpha)$ is the contribution of the human feedback to the updated policy which, in some embodiments, allows the human's decision-data input to influence the policy, weighted by the human's expertise.
- g. $(1-\lambda_h(E))+\lambda_h(E)$ is the normalization factor.which ensures, in some embodiments, that the updated policy remains a valid probability distribution by normalizing the weighted contributions of both the AI agent's policy and the human decision-data feedback.

This ensures, in some embodiments, that human insights are integrated smoothly without overwhelming the agent's learning process. The agent, in some embodiments, gives more weight to feedback from humans with higher expertise, optimizing the learning process and potentially reducing the need for further human interventions.

Examples of Mathematical Optimization:

Optimization

The goal, in some embodiments, is to optimize the cumulative expected reward $J_n$ while minimizing data and resource costs:

$$\max_{\pi,\lambda_h} J(\pi) - C_d(\pi) - C_h(\pi) - C_c(\pi)$$

where:

$$J(\pi) = E\left[\sum_{t=0}^{T} T\gamma^t R(s_t, a_t)\right]$$

- a. $C_d(\pi)$ represents the cost of acquiring new data samples.
- b. $C_h(\pi)$ is the cost of human intervention influenced by the expertise-weighted feedback:

$$C_h(\pi) = \sum_{i=1}^{N} \lambda_h(E) \cdot C_h$$

- c. $C_c(\pi)$ is the computational cost.

Regularization

To prevent over-reliance on human-agent decisions, some embodiments introduce a regularization term $\Omega(\lambda_h)$:

$$\Omega(\lambda h) = \alpha \cdot \|\lambda_h\|_1$$

where:
- a. $\Omega(\lambda_h)$ is the regularization term which, in some embodiments, is added to the optimization objective to penalize certain aspects of the model, such as over-reliance on human feedback or to encourage sparsity in the weighting factor $\lambda_h$
- b. $\lambda_h$ is the weighting factor associated with the human feedback and represents, in some embodiments, how much influence human feedback has on the policy update. Regularizing this term helps control the degree to which human input is incorporated, preventing overfitting to human advice or overly relying on it.
- c. $\|\lambda h\|_1$ is the L1 norm (also known as the Manhattan norm) of $\lambda_h$ which encourages sparsity in $\lambda_h$, meaning, in some embodiments, it promotes situations where the model learns to rely less on human feedback unless absolutely necessary. In practice, this might lead to some values of $\lambda_h$ being zero, meaning no reliance on human feedback for those instances.
- d. $\alpha$ is the regularization coefficient or weight which, in some embodiments, controls the strength of the regularization. A higher $\alpha$ increases the penalty on the weighting factor $\lambda$, making the model more likely to minimize its reliance on human feedback. Conversely, a lower $\alpha$ weakens the regularization, allowing more influence from human feedback.

This, in some embodiments, encourages sparsity in the use of human-agent decision-data, ensuring that the intelligent agent learns autonomously as much as possible.

Dynamic Thresholding

The uncertainty threshold $\theta_u$, in some embodiments, can be dynamically adjusted based on the intelligent agent's learning progress:

$$\theta_u(t) = \theta_{u0} \cdot e^{-\beta t}$$

where:

$\theta_{u0}$ is the initial threshold and $\beta$ which, in some embodiments, controls the rate of decay. representing how uncertain the agent can be before needing help when it begins learning. This allows the system to become more autonomous as it gains confidence over time.

$\theta_u(t)$ is the uncertainty threshold at time t which, in some embodiments, is the dynamic threshold that determines when the AI agent should request help or additional data. It changes over time based on the agent's learning progress.

$e^{-\beta t}$ is the exponential decay factor which, in some embodiments, controls how quickly the uncertainty threshold decreases over time. As time progresses, this factor causes the threshold $\theta_u(t)$ to decrease, meaning the agent becomes more confident and less likely to request help from a human expert.

$\beta$ is the decay rate which, in some embodiments, determines how fast the threshold decreases. A higher $\beta$ means the threshold decreases more quickly, making the agent less likely to ask for help as it learns more.

t is the time or iteration number which, in some embodiments, represents the current time step or iteration in the learning process. As t increases, the threshold $\theta_u(t)$ decreases.

Return on Investment (ROI) Model:
Combined Cost Model

Data Collection Cost ($C_d$): Reduced, in some embodiments, due to active learning's focus on the most informative samples.

Human Intervention Cost ($C_h$): Modulated, in some embodiments, by the threshold $\theta_u(t)$ and the regularization term $\Omega(\lambda_h)$.

Benefit Model

Accuracy Improvement (A): Aims, in some embodiments, to be higher than reinforcement learning or human aided reinforcement learning due to the selective focus on informative samples.

Efficiency Gain (E): Enhanced, in some embodiments, by the reduction in unnecessary human interventions and the focus on high-uncertainty states.

ROI Calculation
HAAML:

$$ROI_{haaml} = \frac{A_{haaml} \cdot E_{haaml}}{C_d + C_h + C_c}$$

where:
a. HAAML is an acronym for Human Assisted Active Machine Learning.
b. $ROI_{haaml}$ is the overall effectiveness and value of incorporating human assistance in the AI system which measures whether the benefits of human feedback (improved decision-making and efficiency) outweigh the costs (data, human involvement, and computational resources).
c. $A_{haaml}$ is the accuracy improvement due to human assistance which reflects how much better the AI agent performs (e.g., more accurate decisions or predictions) because of the feedback or corrections provided by humans. Higher accuracy means fewer errors and better outcomes, increasing the value of human intervention. For example, human feedback may significantly improve the agent's ability to correctly identify fraudulent transactions. A human risk analyst in a business might recognize patterns of fraud that the AI agent missed, leading to fewer false positives (flagging legitimate transactions as fraud) and false negatives (missing actual fraudulent transactions).
d. $E_{haaml}$ is efficiency gain from incorporating human assistance and represents how much more efficiently the AI agent learns or performs its tasks with human help. This could mean requiring fewer data, faster convergence to correct decisions, or reduced time to reach a high level of performance. In some examples, the AI agent becomes more efficient at detecting fraud after receiving human feedback. Over time, in some embodiments, the agent learns from the human-provided insights, allowing it to make quicker and more accurate decisions with less need for human intervention in future transactions. This efficiency gain, in some embodiments, means the AI can process more transactions in less time, reducing the workload on human analysts.
e. $C_d$ is the data collection cost, which is the expense associated with gathering and labeling data for training the AI agent. If human feedback allows the agent to learn effectively from less data, in some embodiments, this cost is reduced, improving ROI. The cost of gathering labeled examples of fraudulent and legitimate transactions. If human feedback allows the AI to learn effectively from a smaller dataset, these costs are reduced. For example, instead of needing thousands of labeled transactions, the AI might only need a few hundred with targeted human guidance.
f. $C_h$ is Human intervention cost, which is the cost, in some embodiments, related to the time, effort, and resources needed for humans to assist the AI agent. This might include providing feedback, making decisions in uncertain situations, or training the agent. High costs here can reduce ROI, especially if the gains in accuracy and efficiency are marginal. The cost, in some embodiments, of involving human fraud analysts to review uncertain transactions and provide feedback. If this cost is high, in some embodiments, it might only be justified if the human input leads to a substantial improvement in the system's accuracy and efficiency. For example, the system should only seek human input when it truly needs it, to avoid overburdening analysts and incurring unnecessary costs.
g. $C_c$ is the computational cost which is the The cost of computational resources required to run the AI system, including processing power, storage, and energy consumption. Efficiently integrating human feedback without significantly increasing computational demands helps to improve ROI. For example, the resources required to process and analyze healthcare payment transactions, including the computational power needed to run the AI models and incorporate human feedback in real-time. Efficient algorithms as described in some examples herein, in some embodiments, minimize (or reduce) computational overhead while integrating human input can keep these costs low, contributing to a better ROI.

This approach, in some embodiments, leverages the strengths of reinforced learning, human assisted active learning, creating a robust and adaptive system that efficiently uses resources, minimizes (or reduces) data requirements, and maximizes (or increases) learning outcomes. For example, a high ROI indicates that human involvement significantly, in some embodiments, enhances the AI's ability to detect and prevent fraudulent transactions, making the system more effective and efficient at safeguarding healthcare payments. None of which is to suggest that all embodiments use these techniques or afford these benefits or that any other description herein is limiting.

In some examples, WTA system can determine which operators are best qualified to make a decision necessary to perform a task using a method comprised of means for determining whether the operator is associated with one or more domains, means for determining whether an operator is ready to receive a decision-request, means for running a suitable algorithm containing program instructions supplied by a second embedded product and/or service.

In one example, the WTA system determines the best available operator to answer the decision by analyzing historical operator data, including the capability, efficiency, and reliability of the operator in the context of the decision by, in some embodiments, executing the following process:

Task Analysis
 a. Input: Task requirements
 b. Output: Detailed task specifications Agent Delegation Profiling
 a. Input: List of available operators to delegate question
 b. Output: Profiled capabilities, performance metrics, and resources for each operator Scoring and Ranking Capability Match Score: Calculate a score based on how well the operator's skills align with the task requirements.

$$\text{Match Score}_i = \sum_{j=1}^{n} w_j \times \text{capability}_{ij}$$

a. where $w_j$ is the weight of the jth requirement, and $\text{capability}_{ij}$ is the capability of the ith agent for the ith requirement.

Efficiency Score: Assess resource efficiency for each agent.

$$\text{Efficiency Score} = \frac{\text{Task Completion}}{\text{Time to Respond}}$$

Reliability Score: Include historical performance data.

Reliability Score$_i$=Past Success Rate$_i$

Overall Score: Combine the scores to get an overall score for each operator.

Overall Score$_i$ =

$\alpha \times$ Match Score$_i + \beta \times$ Efficiency Score$_i + \gamma \times$ Reliability Score$_i$ where $\alpha$, $\beta$, and $\gamma$ are weights that sum to 1.

Agent Selection

First, some embodiments, rank the operators based on their overall scores.

Next, some embodiments, select the top-ranked operators (s) to perform the task.

In another example of WTA system determining the best available operator to answer a decision, a knowledge ontology may be used that categorizes various domains and subdomains. Each operator's knowledge can be mapped to this ontology, allowing the system to determine which domain(s) the operator belongs to. If an operator's historical behaviors are common within a specific domain, semantic analysis can be used in the mapping.

In another example of WTA system determining the best available operator to answer a decision, operators may be associated with various knowledge tags, examples of which could be "project-planning", or "pricing-strategy".

In another example of WTA system determining the best available operator to answer a decision, domain specific tasks or problems can be administered to operators to see how well they perform and. Based upon the accuracy, speed and efficiency of the operator's decision making, the system can determine the operator's proficiency in that domain by computing an operator proficiency score across one or more registered domains in the system.

In another example of WTA system determining the best available operator to answer a decision, operators can self-report their knowledge across one or more domains using a skill matrix. Each domain is represented as a vector of specific skills, with proficiency levels ranging from basic to expert.

In another example of WTA system determining the best available operator to answer a decision, a health check may be performed to ensure that an operator device is online and can able to message over the network One or more scoring methods of WTA system determining the best available operator may be combined to get the final domain expertise score $E_i$ Non-Linear Confidence Factor Let $C_i$ be the confidence factor, calculated using a sigmoid function to moderate extreme values:

$$C_i = \frac{1}{1 + e^{-kx(\text{Success Rate}_i - 0.5)}}$$

Where k controls the steepness of the sigmoid curve, and Success Rate$_i$ is the historical success rate of the agent in the domain (ranging from 0 to 1).

If an agent's success rate is low, the confidence factor will also be low. This means that the system recognizes the agent's limited effectiveness in the domain and will likely require human intervention to verify or override the agent's decisions. For agents with a moderate success rate, the confidence factor increases gradually. The system might still involve human experts but will rely more on the AI's judgment. When an agent consistently performs well (high success rate), in some embodiments, the confidence factor approaches 1, meaning the system trusts the agent's decisions more and requires less human oversight.

Human-AI Collaboration

The Non-Linear Confidence Factor, in some embodiments, helps create a dynamic workflow where human experts are only called upon when necessary, optimizing their involvement. For example, in cases where an AI agent's confidence is low (e.g., due to an uncertain pattern in the data), the system flags the decision for human input/review. Conversely, when the confidence is high, the agent can act autonomously, accelerating the fraud detection process.

Reducing False Positives

By adjusting the confidence factor based on historical performance, in some embodiments, the system helps to reduce false positives—where legitimate transactions might otherwise be flagged as fraudulent. This, in some embodiments, reduces the workload for human reviewers and minimizes disruption for healthcare providers and patients.

Continuous Learning

As the AI agents process more cases and receive feedback from human experts, in some embodiments, their success rate can improve. The confidence factor, in some embodiments, evolves over time, allowing agents to take on more responsibility as they become more accurate, which may be helpful in adapting to the ever-changing landscape of healthcare payment fraud.

In some examples, the system is configured with the following process:
a. AI agent identifies a potentially fraudulent transaction
b. WTA System calculates the agent's confidence in this decision using the Non-Linear Confidence Factor based on the agent's historical performance.
c. If the confidence factor is low (e.g., less than a first threshold), the system escalates the case to a human expert for further review.
d. If the confidence factor is high (e.g., greater than a second threshold), the transaction is flagged as fraudulent without additional human intervention.
e. The outcome (whether the transaction was indeed fraudulent) may be fed back into the system, updating the agent's success rate and refining future confidence calculations.

By dynamically adjusting confidence levels based on historical success, in some embodiments, it ensures that human experts are involved when necessary, thus balancing efficiency with accuracy in detecting fraudulent activities. This approach, in some embodiments, allows for continuous improvement in both AI performance and overall fraud detection processes.

Final Domain Expertise Score

In the domain of healthcare payment fraud, in some embodiments, different AI agents might specialize in various aspects, such as detecting fraudulent billing practices, identifying false claims, or analyzing suspicious payment patterns. The Final Domain Expertise Score, in some embodiments, is used to evaluate and rank these agents based on their knowledge, experience, and effectiveness in the relevant domain, ensuring that the right agent is selected for each specific task.

Combine the components with a weighted sum and apply the confidence factor:

$$E_{final_i} = C_i \times (S_i + T_i + E_i + O_i)$$

where:
a. $S_i$ is the Skill Score that reflects how well the AI agent's capabilities align with the specific requirements of the fraud detection task. For example, detecting patterns in large datasets or recognizing anomalies in payment histories. Higher skill scores indicate that the agent has the necessary expertise in the required domain, making it more likely to succeed in the task.
b. $T_i$ is the Training Match Score, which in some examples, assesses the extent to which the AI agent has been trained with data relevant to healthcare payment fraud. An AI agent trained extensively on fraud cases within the healthcare domain will have a higher training match score. A higher training match score increases the likelihood that the agent will correctly identify fraudulent activities, as it has been exposed to similar scenarios during its training.
c. $E_i$ is the Experience Match Score can represent a score that reflects the AI agent's practical experience in dealing with healthcare fraud cases. It is based on the agent's history of handling similar tasks, including the number of cases handled and the success rate. An AI agent with a higher experience match score has proven expertise in the domain, suggesting it can handle complex fraud detection tasks with greater accuracy.
d. $O_i$ is the Ontology Match Score which can indicate whether the AI agent's knowledge is structured in a way that aligns with the domain-specific ontology, such as healthcare fraud terminology, processes, and regulations.
e. $C_i$ is the Non-Linear Confidence Score which is applied to the overall score to adjust it based on the agent's confidence, derived from its historical success rate in the domain. The confidence factor, in some embodiments, is calculated using a sigmoid function to moderate extreme values, ensuring that confidence increases or decreases gradually. The non-linear confidence factor, in some embodiments, allows the system to account for the agent's performance history, giving more weight to agents that have consistently performed well while reducing reliance on those with inconsistent results.

Optimal Task Assignment

By calculating the Final Domain Expertise Score for each agent, in some embodiments, the system can assign tasks to the agent best suited to handle them. This ensures, in some embodiments, that complex fraud detection tasks are handled by the most qualified agents, improving the overall accuracy of the system.

Reduced Human Intervention

In scenarios where the Final Domain Expertise Score is high, in some embodiments, the system can trust the AI agent to handle the task with minimal human oversight. This, in some embodiments, reduces the burden on human experts and allows them to focus on more ambiguous or high-risk cases.

Dynamic Adaptation

The inclusion of the Non-Linear Confidence Factor, in some embodiments, means that the Final Domain Expertise Score adapts to the agent's performance over time. As agents handle more cases and receive feedback, in some embodiments, their scores adjust, allowing the system to dynamically choose the best agent for the job. The confidence factor is distinct from the trust score. The trust score is used, in some embodiments, to determine whether the WTA system needs to reach out to a human for assistance in a decision. The trust score threshold is, in some embodiments, configurable by humans. The confidence factor is different. For instance, a human confidence factor and may be used by an AI agent (or other parts of the system) to determine the best (or an adequate) human to request assistance from. The quality of historical decisions, the domain expertise of the human etc. may be incorporated into a human confidence factor. For example, there may be 4 different fraud analysts at the company registered with the system, and based on the speed and accuracy of each employee a different confidence factor may be computed and then evaluated by an AI agent to determine which employee may be best suited to answer a particular question or provide input during execution of a workflow. Similarly, an AI confidence factor may be used in a multi-agent AI system to select the best (or a suitable) AI agent to make process a task (which may be a subtask) in a workflow. In some embodiments, systems of AI agents with different expertise may each play a part in a workflow execution.

Example in Workflow: Detecting Fraudulent Claims in Healthcare Payments

Step 1: Evaluating Agents

In some examples, the system (i.e., the computer system, as that term is used herein, which may involve one or more computers) employs multiple AI agents to detect fraudulent activities related to patient payments. These might include detecting unauthorized charges, duplicate payments, or payments that do not align with the provided healthcare services.

For example,

Agent X specializes in identifying payment discrepancies where the billed amount doesn't match the services provided.

Agent Y focuses on detecting patterns of unauthorized recurring charges.

Agent Z excels at cross-referencing patient payment histories with insurance claims to identify inconsistencies.

The system, in some embodiments, needs to determine which AI agent should analyze a specific patient payment that has been flagged as potentially fraudulent. To make this decision, in some embodiments, the system calculates the Final Domain Expertise Score for each agent, using the following components:

Skill Score:

Agent X has high proficiency in detecting discrepancies between billed services and payments, which is critical for this task.

Agent Y has moderate skills in this area but excels in recognizing patterns of recurring unauthorized charges.

Agent Z has basic skills in this specific task but is stronger in cross-referencing payments with insurance claims.

Training Match Score:

Agent X has been extensively trained on datasets involving patient payment discrepancies, giving it a high training match score.

Agent Y has relevant training but more focused on recurring payments, so it receives a moderate score.

Agent Z has minimal training directly related to this specific type of payment discrepancy.

Experience Match Score:

Agent X has successfully handled numerous cases of payment discrepancies in the past, resulting in a high experience match score.

Agent Y has dealt with similar cases but with less frequency and mixed results, giving it a moderate score.

Agent Z has little direct experience with this type of fraud, leading to a lower score.

Ontology Match Score:

Agent X has knowledge structures that align well with the ontology of patient payment fraud, earning a high ontology match score.

Agent Y has a moderate match, while Agent Z scores lower, as its expertise is more aligned with other types of fraud.

Non-Linear Confidence Factor:

Agent X has a historical success rate of 85% in detecting fraudulent patient payments, which translates into a high confidence factor.

Agent Y has a 65% success rate, resulting in a moderate confidence factor.

Agent Z has a 50% success rate, yielding a lower confidence factor, indicating that the system should be cautious in relying on its decisions for this task.

Step 2: Task Assignment

After calculating the Final Domain Expertise Score for each agent:

Agent X achieves the highest score, combining its strong skills, relevant training, extensive experience, structured domain knowledge, and high confidence factor. This makes it the top choice for analyzing the flagged patient payment.

Agent Y scores moderately but is not as well-suited as Agent X for this particular task.

Agent Z scores the lowest, primarily due to its limited experience and lower confidence factor, indicating that it is not the best fit for this task.

Given these scores, the system assigns the task of analyzing the potentially fraudulent patient payment to Agent X.

Step 3: Human Decisions

The system, in some embodiments, also considers the confidence factor to determine the level of human decision-data input required:

Agent X's high confidence factor suggests that it can handle the task autonomously. However, due to the sensitive nature of patient payments, the system might still opt for a human expert to review Agent X's findings before finalizing any actions.

If Agent Y had been selected, the system would likely require more substantial human intervention, given the moderate confidence factor, to ensure accuracy and avoid any potential errors.

If Agent Z had been selected, the system would likely flag the case for immediate human review due to the lower confidence factor, despite the assignment.

Step 4: Adaptive Learning

Once the task is completed, the outcome is fed back into the system:

Success: If Agent X correctly identifies the payment as fraudulent (or correctly dismisses it), its success rate is updated positively, reinforcing its confidence factor for future tasks.

Error: If Agent X misses the fraud or incorrectly flags a legitimate payment, this would decrease its success rate, leading to a lower confidence factor in future cases.

This feedback mechanism ensures that the Final Domain Expertise Score evolves over time, reflecting the agent's growing expertise or identifying areas where it may need retraining.

The Final Domain Expertise Score, in some embodiments, can be used as a tool in optimizing the workflow of AI agents in the fight against healthcare payment fraud. By evaluating each agent's skills, training, experience, and domain knowledge, and adjusting for confidence based on historical success using a weighted sum of skill, training, experience, and ontology match scores with a non-linear confidence factor, the system can dynamically and accurately select the most qualified agents for specific tasks. This approach, in some embodiments, not only enhances the efficiency and effectiveness of fraud detection but also ensures that human resources are used where they are most needed, striking a balance between AI autonomy and human intervention.

The method used to determine the Final Domain Expertise Score for AI agents, in some embodiments, encompassing evaluations of skills, training, experience, domain knowledge, and confidence based on historical performance, can similarly be applied to selecting expert human agents. By systematically assessing human experts against these criteria, in some embodiments, organizations can identify and assign the most qualified individuals to specific tasks. This structured approach, in some embodiments, ensures that both human and AI resources are optimally utilized, enhancing the overall effectiveness and accuracy of workflows in combating complex challenges such as healthcare payment fraud.

5. Processes for Generating a Workflow-Model

Workflow models, in some embodiments, can be created using one or more personal devices suitable for natural language input technology, for example a watch with a microphone, network connection, system memory, and one or more processors to run instructions. An operator of the watch can use natural language to describe a problem to be solved by the WTA system, including the desired goal or outcome that the workflow-model aims to accomplish, any actions to be performed, any key decisions to be made during workflow-model execution, and optional context surrounding what should be prioritized when working toward that goal, for example time, accuracy, precision. WTA system can create a template for the workflow-model and present it to the operator of the device using a combination of visual, audible and/or written presentation so that the operator can review and validate the workflow that was generated. Examples of visual playback include display of a process diagram with the tasks and/or subtasks of the proposed workflow broken down into steps (or sub-tasks) at each stage process diagram, or a process graph. The operator may review the initial workflow and include refine the context, boundaries, and detail surrounding the problem and goal using the watch in this example. Once the operator deems the workflow-model is ready to run, they can instruct the WTA system using audible natural language to create the workflow. An example of the process is outlined below:

Such a process, in some embodiments, can be implemented using a multi-system intelligent agent design with human operator feedback as follows:

```
# Step 1: Task Understanding and Delegation
main_agent:
    workflow_description = receive_task_description( )
    task_requirements = task_analysis_agent.analyze_workflow(workflow_description)
        Input: workflow_description
        Output: task_requirements
    data = data_collection_agent.collect_data(task_requirements)
        Input: task_requirements
        Output: data
# Step 2: Data Preparation
data_preparation_agent:
    prepared_data = clean_and_preprocess(data)
        Input: data
        Output: prepared_data
# Step 3: Model Selection
model_selection_agent:
    selected_workflow_model = choose_model(task_requirements, prepared_data)
        Input: task_requirements, prepared_data
        Output: selected_workflow_model, action_model
# Step 4: Model Training and Initial Optimization
training_agent:
    trained_model = train_model(selected_model, prepared_data)
        Input: selected_model, prepared_data
        Output: trained_model
optimization_agent:
    optimized_model = optimize_model(trained_model)
        Input: trained_model
        Output: optimized_model
# Step 5: Initial Model Evaluation and Feedback Loop
evaluation_agent:
    initial_evaluation = evaluate_model(optimized_model)
        Input: optimized_model
        Output: initial_evaluation
    If initial_evaluation does not meet requirements:
        refined_model = refine_model(optimized_model, initial_evaluation)
            Input: optimized_model, initial_evaluation
            Output: refined_model
        Re-evaluate the refined model:
        final_evaluation = evaluate_model(refined_model)
            Input: refined_model
            Output: final_evaluation
        If final_evaluation meets requirements:
            validated_model = refined_model
                Input: refined_model
                Output: validated_model
        Else:
            Continue refinement loop or escalate for manual intervention
                Input: final_evaluation
                Output: escalation or further refinement
```

```
    Else:
        validated_model = optimized_model
            Input: optimized_model
            Output: validated_model
    # Step 6: Human Review for Refinement and Tuning
    human_review_agent:
        present_model_to_human(validated_model)
            Input: validated_model, action_model
            Output: human_feedback, refined_model
        If human_feedback indicates further tuning is needed:
            refined_model = refine_model_based_on_human_feedback(validated_model,
    human_feedback)
                Input: validated_model, action_model, human_feedback
                Output: refined_model
        Revalidate the refined model with human input:
            Human_approved_model         =
    human_review_agent.present_model_to_human(refined_model)
                Input: refined_model
                Output: human_approved_model
        Else:
            human_approved_model = validated_model
                Input: validated_model
                Output: human_approved_model
    # Step 7: Deployment and Execution
    deployment_agent:
        deploy_model(human_approved_model)
            Input: human_approved_model
            Output: deployed model
    execution_agent:
        execute_action_plan(action_plan)
            Input: action_plan
            Output: executed action plan
    # Step 8: Monitoring and Continuous Learning
    feedback_agent:
        feedback = collect_feedback(deployed_model)
            Input: deployed_model
            Output: decision-data
    learning_agent:
        updated_model = update_model(human_approved_model, feedback)
            Input: human_approved_model, feedback
            Output: updated model(s)
```

Figure 13:
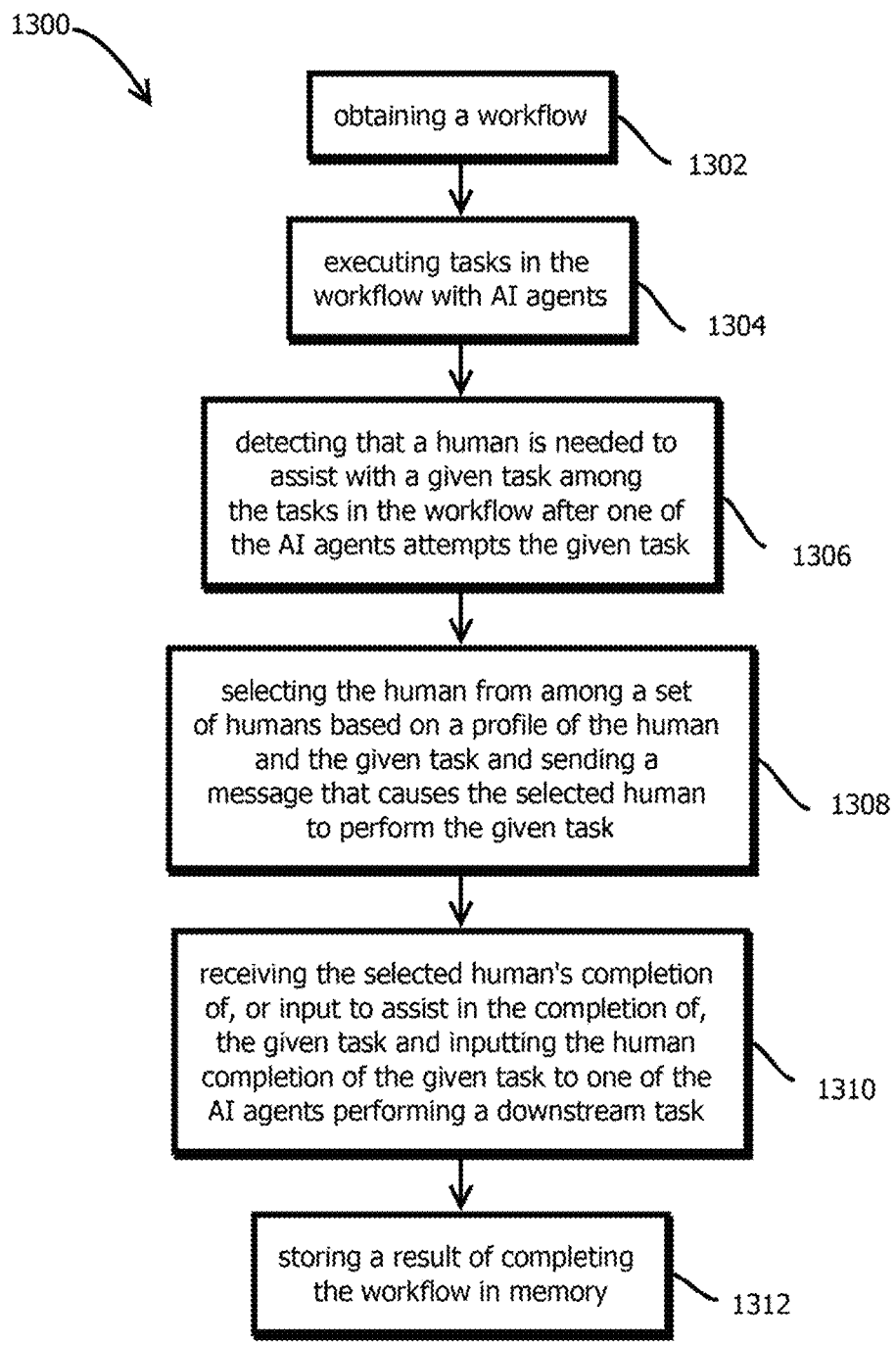
FIG. 13 is a flowchart illustrating an example of a process performed by some embodiments of the WTA system in accordance with some embodiments.

FIG. 13 is a flow chart illustrating an example of a process 1300 by which the system 100 or other systems may facilitate cooperation between humans and AI agents. In some embodiments, the process includes obtaining a workflow, as indicated by block 1302. Some embodiments may include executing tasks in the workflow with AI agents, as indicated by block 1304. Some embodiments further include detecting that a human is needed to assist with a given task among the tasks in the workflow after one of the AI agents attempts the given task, as indicated by block 1306. Some embodiments include selecting the human from among a set of humans based on a profile of the human and the given task and sending a message that causes the selected human to perform the given task, as indicated by block 1308. Some embodiments include receiving the selected human's completion of, or input to assist in the completion of, the given task and inputting the human completion of the given task, or input, to one of the AI agents performing a downstream task as indicated by 1310. Some embodiments include storing a result of completing the workflow in memory, as indicated by block 1312.

System memory in the computing devices described above may include a tangible program carrier having program instructions stored thereon, by which the present functionality may be implemented when those instructions are executed by one or more computer processors. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory may include a non-transitory computer readable storage medium that may have program instructions stored thereon that are executable by a computer processor (e.g., one or more of processors) to cause the subject matter and the functional operations described herein. A memory may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

Embodiments of the techniques described herein may be implemented with a computing system having a single computing device or multiple computing devices configured to host different portions or instances of embodiments. Multiple computers may provide for parallel or sequential processing/execution of one or more portions of the techniques described herein. The computer system may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computers may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted to the computer system via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed, effectuate operations comprising: obtaining, with a computer system, a workflow; executing, with the computer system, tasks in the workflow with artificial intelligence (AI) agents; detecting, with the computer system, that a human is needed to assist with a given task among the tasks in the workflow after one of the AI agents attempts the given task; selecting, with the computer system, the human from among a set of humans based on a profile of the human and the given task and sending a message that causes the selected human to perform the given task; receiving, with the computer system, the selected human's completion of, or input to assist in the completion of, the given task and inputting the human completion of the given task to one of the AI agents performing a downstream task in the workflow; and storing, with the computer system, a result of completing the workflow in memory.
2. The medium of embodiment 1, wherein: the workflow comprises a set of tasks, at least some of the tasks being associated with a topic by which the human is selected based on a record indicating the human has expertise in that topic.
3. The medium of embodiment 1, wherein: the workflow comprises a set of tasks, at least some of the tasks being associated with different AI agents by which the at least some of the tasks are performed, the operations comprising selecting among the AI agents.
4. The medium of embodiment 1, wherein detecting that the human is needed to assist with the given task comprises: determining a trust score; and determining that the trust score satisfies a threshold value.
5. The medium of embodiment 1, wherein detecting that the human is needed to assist with the given task comprises: extracting features of the given task; calculating uncertainties for each of a plurality of modalities of features; and combining the uncertainties with Bayesian Fusion.
6. The medium of embodiment 5, wherein detecting that the human is needed to assist with the given task comprises: predicting a result of completing the task with a machine learning model; determining a score based on the predicting and the combination of the uncertainties; and determining that the score satisfies a threshold.

7. The medium of embodiment 1, wherein detecting that the human is needed to assist with the given task comprises: comparing a preliminary result of completing the given task with the one AI agents with a response of a machine learning model configured to predict a result of completing the task based on data about the given task.

8. The medium of embodiment 1, comprising: generating context meta-data associated with detecting that the human is needed to assist, the context meta-data comprising a human-readable analysis of data inputs that contributed to the detection.

9. The medium of embodiment 8, wherein generating context meta-data comprises computing Shapley values of features in the data inputs.

10. The medium of embodiment 1, comprising: validating a result of completing the given task with cognitive computing.

11. The medium of embodiment 1, wherein selecting the human comprises: determining a topic associated with the given task in the workflow; an accessing, based on the topic, a subset of human experts in an organization based on an ontology associating human experts with topics.

12. The medium of embodiment 1, wherein selecting the human comprises selecting the human with a reinforcement learning model.

13. The medium of embodiment 1, wherein selecting the human comprises: selecting the human with Thompson Sampling.

14. The medium of embodiment 1, wherein the workflow is performed with expertise-weighted feedback, dynamic thresholding, non-linear confidence adjustments, meta-learning, and cognitive learning.

15. The medium of any one of embodiments 1-14, comprising: performing active learning with a first model detecting that the human is needed or with a second model selecting the human.

16. The medium of embodiment 15, comprising: selecting a subset of available samples to train on with the active learning.

17. A method, comprising: performing the operations of any one of embodiments 1-16.

18. A computer system configured to perform the operations of any one of embodiments 1-16.

What is claimed is:

1. A tangible, non-transitory, machine-readable medium storing instructions that when executed, effectuate operations comprising:
   obtaining, with a computer system, a workflow;
   executing, with the computer system, tasks in the workflow with artificial intelligence (AI) agents;
   detecting, with the computer system, that a human is needed to assist with a given task among the tasks in the workflow after one of the AI agents attempts the given task, wherein detecting that the human is needed to assist with the given task comprises:
      extracting features of the given task;
      calculating uncertainties for each of a plurality of modalities of features; and
      combining the uncertainties with Bayesian Fusion;
   selecting, with the computer system, the human from among a set of humans based on a profile of the human and the given task and sending a message that causes the selected human to perform the given task;
   receiving, with the computer system, the selected human's completion of, or input to assist in the completion of, the given task and inputting the human completion of the given task, or input, to one of the AI agents performing a downstream task in the workflow;
   storing, with the computer system, a result of completing the workflow in memory; and
   training the AI agents or other AI agents using the stored result, wherein the resulting trained AI agent or other AI agents are capable of executing the given task.

2. The medium of claim 1, wherein:
   the workflow comprises a set of tasks, at least some of the tasks being associated with a topic by which the human is selected based on a record indicating the human has expertise in that topic;
   sending the message comprises sending the message to a mobile application executing on a mobile computing device of the selected human; and
   receiving the completion of, or input to assist in the completion of, the given task comprises receiving training data used to train new versions of at least some of the AI agents.

3. The medium of claim 1, wherein:
   the workflow comprises a set of tasks, at least some of the tasks being associated with different AI agents by which the at least some of the tasks are performed, the operations comprising selecting among the AI agents with steps for routing to AI agents.

4. The medium of claim 1, wherein detecting that the human is needed to assist with the given task comprises:
   determining a trust score with steps for determining the trust score; and
   determining that the trust score satisfies a threshold value.

5. The medium of claim 1, wherein detecting that the human is needed to assist with the given task comprises:
   predicting a result of completing the task with a machine learning model;
   determining a score based on the predicting and the combination of the uncertainties; and
   determining that the score satisfies a threshold.

6. The medium of claim 1, wherein detecting that the human is needed to assist with the given task comprises:
   comparing a preliminary result of completing the given task with the one AI agents with a response of a machine learning model configured to predict a result of completing the task based on data about the given task.

7. The medium of claim 1, comprising:
   generating context meta-data associated with detecting that the human is needed to assist, the context meta-data comprising a human-readable analysis of data inputs that contributed to the detection.

8. The medium of claim 7, wherein generating context meta-data comprises computing Shapley values of features in the data inputs.

9. The medium of claim 1, comprising:
   validating a result of completing the given task with cognitive computing.

10. The medium of claim 1, wherein selecting the human comprises:
determining a topic associated with the given task in the workflow; and
accessing, based on the topic, a subset of human experts in an organization based on an ontology associating human experts with topics.

11. The medium of claim 1, wherein selecting the human comprises:
selecting the human with a reinforcement learning model.

12. The medium of claim 1, wherein selecting the human comprises:
selecting the human with Thompson Sampling.

13. The medium of claim 1, wherein the workflow is performed with expertise-weighted feedback, dynamic thresholding, non-linear confidence adjustments, meta-learning, and cognitive learning.

14. The medium of claim 1, comprising:
performing active learning with a first model detecting that the human is needed or with a second model selecting the human.

15. The medium of claim 14, comprising:
selecting a subset of available samples to train on with the active learning with steps for selecting most informative samples for further training.

16. The medium of claim 1, comprising:
steps for updating a workflow model by which the workflow is executed.

17. The medium of claim 1, comprising:
steps for implementing a workflow task agent system.

18. The medium of claim 1, comprising:
steps for running a workflow model by which the workflow is executed.

19. A method, comprising:
obtaining, with a computer system, a workflow;
executing, with the computer system, tasks in the workflow with artificial intelligence (AI) agents;
detecting, with the computer system, that a human is needed to assist with a given task among the tasks in the workflow after one of the AI agents attempts the given task, wherein detecting that the human is needed to assist with the given task comprises:
extracting features of the given task;
calculating uncertainties for each of a plurality of modalities of features; and
combining the uncertainties with Bayesian Fusion;
selecting, with the computer system, the human from among a set of humans based on a profile of the human and the given task and sending a message that causes the selected human to perform the given task;
receiving, with the computer system, the selected human's completion of, or input to assist in the completion of, the given task and inputting the human completion of the given task, or input, to one of the AI agents performing a downstream task in the workflow;
storing, with the computer system, a result of completing the workflow in memory; and
training the AI agents or other AI agents using the stored result, wherein the resulting trained AI agent or other AI agents are capable of executing the given task.

20. The method of claim 19, wherein:
the workflow comprises a set of tasks, at least some of the tasks being associated with a topic by which the human is selected based on a record indicating the human has expertise in that topic;
sending the message comprises sending the message to a mobile application executing on a mobile computing device of the selected human; and
receiving the completion of, or input to assist in the completion of, the given task comprises receiving training data used to train new versions of at least some of the AI agents.

21. The method of claim 19, wherein:
the workflow comprises a set of tasks, at least some of the tasks being associated with different AI agents by which the at least some of the tasks are performed, the operations comprising selecting among the AI agents with steps for routing to AI agents.

22. The method of claim 19, wherein detecting that the human is needed to assist with the given task comprises:
determining a trust score with steps for determining the trust score; and
determining that the trust score satisfies a threshold value.

23. The method of claim 19, wherein detecting that the human is needed to assist with the given task comprises:
predicting a result of completing the task with a machine learning model;
determining a score based on the predicting and the combination of the uncertainties; and
determining that the score satisfies a threshold.

24. The method of claim 19, wherein detecting that the human is needed to assist with the given task comprises:
comparing a preliminary result of completing the given task with the one AI agents with a response of a machine learning model configured to predict a result of completing the task based on data about the given task.

25. The method of claim 19, comprising:
generating context meta-data associated with detecting that the human is needed to assist, the context meta-data comprising a human-readable analysis of data inputs that contributed to the detection.

26. The method of claim 25, wherein generating context meta-data comprises computing Shapley values of features in the data inputs.

27. The method of claim 19, comprising:
validating a result of completing the given task with cognitive computing.

28. The method of claim 19, wherein selecting the human comprises:
determining a topic associated with the given task in the workflow; and
accessing, based on the topic, a subset of human experts in an organization based on an ontology associating human experts with topics.

29. The method of claim 19, wherein selecting the human comprises:
selecting the human with a reinforcement learning model.

30. The method of claim 19, wherein selecting the human comprises:
selecting the human with Thompson Sampling.

31. The method of claim 19, wherein the workflow is performed with expertise-weighted feedback, dynamic thresholding, non-linear confidence adjustments, meta-learning, and cognitive learning.

32. The method of claim 19, comprising:
performing active learning with a first model detecting that the human is needed or with a second model selecting the human.

33. The method of claim 32, comprising:
selecting a subset of available samples to train on with the active learning with steps for selecting most informative samples for further training.

34. The method of claim 19, comprising:
steps for updating a workflow model by which the workflow is executed.

35. The method of claim 19, comprising:
steps for implementing a workflow task agent system.

36. The method of claim 19, comprising:
steps for running a workflow model by which the workflow is executed.

* * * * *